(12) United States Patent
Zhang et al.

(10) Patent No.: US 10,433,180 B2
(45) Date of Patent: Oct. 1, 2019

(54) DYNAMIC MEDIUM SHARING

(71) Applicant: QUALCOMM Incorporated, San Diego, CA (US)

(72) Inventors: Xiaoxia Zhang, San Diego, CA (US); Taesang Yoo, San Diego, CA (US); Seyed Ali Akbar Fakoorian, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 15/829,094

(22) Filed: Dec. 1, 2017

(65) Prior Publication Data

US 2018/0184302 A1 Jun. 28, 2018

Related U.S. Application Data

(60) Provisional application No. 62/437,870, filed on Dec. 22, 2016.

(51) Int. Cl.
| | | |
|---|---|---|
| *H04W 16/14* | (2009.01) | |
| *H04W 72/10* | (2009.01) | |
| *H04W 72/12* | (2009.01) | |
| *H04W 74/08* | (2009.01) | |
| *H04W 74/02* | (2009.01) | |

(52) U.S. Cl.
CPC ........... *H04W 16/14* (2013.01); *H04W 72/10* (2013.01); *H04W 72/1242* (2013.01); *H04W 74/02* (2013.01); *H04W 74/08* (2013.01); *H04W 74/0808* (2013.01); *H04W 74/0816* (2013.01)

(58) Field of Classification Search
CPC . H04W 16/14; H04W 74/0816; H04W 74/02; H04W 74/0808; H04W 72/10; H04W 74/08; H04W 72/1242
See application file for complete search history.

(56) References Cited

U.S. PATENT DOCUMENTS

| | | | |
|---|---|---|---|
| 7,324,491 B1 * | 1/2008 | Benveniste | H04L 12/66 370/338 |
| 2007/0014268 A1 | 1/2007 | Kim et al. | |
| 2013/0077554 A1 * | 3/2013 | Gauvreau | H04L 5/001 370/312 |

(Continued)

OTHER PUBLICATIONS

International Search Report and Written Opinion—PCT/US2017/064477—ISA/EPO—dated Feb. 23, 2018.

*Primary Examiner* — Hashim S Bhatti
(74) *Attorney, Agent, or Firm* — Haynes and Boone, LLP

(57) ABSTRACT

Wireless communications systems and methods related to dynamic medium sharing are provided. A first wireless communication device communicates with a second wireless communication device, a reservation request (RRQ) for a transmission opportunity (TXOP) in a shared spectrum. The shared spectrum is shared by a plurality of network operating entities. The first wireless communication device and the second wireless communication device are associated with a first network operating entity of the plurality of network operating entities. The RRQ indicates a first traffic priority of data to be communicated. The first wireless communication device communicates with the second wireless communication device, the data of the first traffic priority during the TXOP.

28 Claims, 18 Drawing Sheets

(56) References Cited

U.S. PATENT DOCUMENTS

2015/0289293 A1* 10/2015 Zhang .................. H04W 74/002
 455/404.1
2015/0381518 A1* 12/2015 Lee ....................... H04L 45/566
 370/349
2016/0302237 A1 10/2016 Gupta et al.

* cited by examiner

DYNAMIC MEDIUM SHARING

CROSS REFERENCE TO RELATED APPLICATIONS

The present application claims priority to and the benefit of the U.S. Provisional Patent Application No. 62/437,870, filed Dec. 22, 2016, which is hereby incorporated by reference in its entirety as if fully set forth below and for all applicable purposes.

TECHNICAL FIELD

This application relates to wireless communication systems, and more particularly to dynamic medium sharing.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless communications system may operate over a shared spectrum, meaning that the wireless communications system includes one or more frequency bands that may be shared by multiple network operating entities. The shared spectrum may include unlicensed spectrum and/or licensed spectrum. In some instances, multiple network operating entities may share their licensed spectrum with each other to better utilize the spectrum. In some other instances, multiple network operating entities may obtain a licensed spectrum together.

Use of the available band spectrum may then be subject to a contention procedure that may involve the use of a medium-sensing procedure. For example, to avoid interference between devices operated by different network operating entities, the wireless communications system may employ medium-sensing procedures, such as listen-before-talk (LBT), to ensure a particular channel is clear before transmitting a message. Medium-sensing procedures may utilize substantial signaling overhead and may result in increased latency, thus adversely affecting the use of shared spectrum by multiple network operating entities.

One approach to reducing medium-sensing signaling overheads is to employ a priority-based coordinated access scheme for spectrum sharing. In a priority-based coordinated access scheme, a shared spectrum is partitioned into multiple time periods. Each time period is designated for a particular type of access and may include priority-based channel sensing periods. For example, a time period can be allocated to a particular network operator for exclusive access of the shared spectrum, where no reservation from the particular network operator is required. Alternatively, a time period can be shared among multiple network operators on a priority basis with reservations, for example, by transmitting reservation signals in a corresponding channel sensing period so that other nodes may yield access. For example, a high priority network operator may have priority or guaranteed access of the shared spectrum in a time period, but requires a prior reservation of the time period. When the high priority network operator does not reserve the time period, a low priority network operator can opportunistically access the shared spectrum in the time period.

While the priority-based coordinated access scheme allows multiple operators to operate over a shared spectrum, the bandwidth overhead of the priority-based channel sensing periods may be substantial as the number of priorities increases. Accordingly, improved procedures for reserving and using a shared spectrum between network operating entities are desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes communicating, by a first wireless communication device with a second wireless communication device, a reservation request (RRQ) for a transmission opportunity (TXOP) in a shared spectrum, wherein the shared spectrum is shared by a plurality of network operating entities, wherein the first wireless communication device and the second wireless communication device are associated with a first network operating entity of the plurality of network operating entities, and wherein the RRQ indicates a first traffic priority of data to be communicated; and communicating, by the first wireless communication device with the second wireless communication device, the data of the first traffic priority during the TXOP.

In an additional aspect of the disclosure, a method of wireless communication, includes communicating, by a first wireless communication device with a second wireless communication device, a reservation request (RRQ) for communication in a link direction during a transmission opportunity (TXOP) in a shared spectrum, wherein the shared spectrum is shared by a plurality of network operating entities, and wherein the first wireless communication device and the second wireless communication device are associated with a first network operating entity of the plurality of network operating entities; communicating, by the first wireless communication device with the second wireless communication device, a reservation response (RRS) in a first contention period of a plurality of contention periods associated with a first access priority of the first network operating entity in the link direction; and communicating, by the first wireless communication device with the second wireless communication device, data in the link direction during the TXOP.

In an additional aspect of the disclosure, an apparatus comprising a transceiver configured to communicate with a first wireless communication device, a reservation request (RRQ) for a transmission opportunity (TXOP) in a shared spectrum, wherein the shared spectrum is shared by a plurality of network operating entities, wherein the apparatus and the first wireless communication device are associated with a first network operating entity of the plurality of network operating entities, and wherein the RRQ indicates a first traffic priority of data to be communicated; and communicate with the first wireless communication device, the data of the first traffic priority during the TXOP.

In an additional aspect of the disclosure, an apparatus comprising a transceiver configured to communicate, with a first wireless communication device, a reservation request (RRQ) for communication in a link direction during a transmission opportunity (TXOP) in a shared spectrum, wherein the shared spectrum is shared by a plurality of network operating entities, and wherein the apparatus and the first wireless communication device are associated with a first network operating entity of the plurality of network operating entities; communicate, with the first wireless communication device, a reservation response (RRS) in a first contention period of a plurality of contention periods associated with a first access priority of the first network operating entity in the link direction; and communicate, with the first wireless communication device, data in the link direction during the TXOP.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
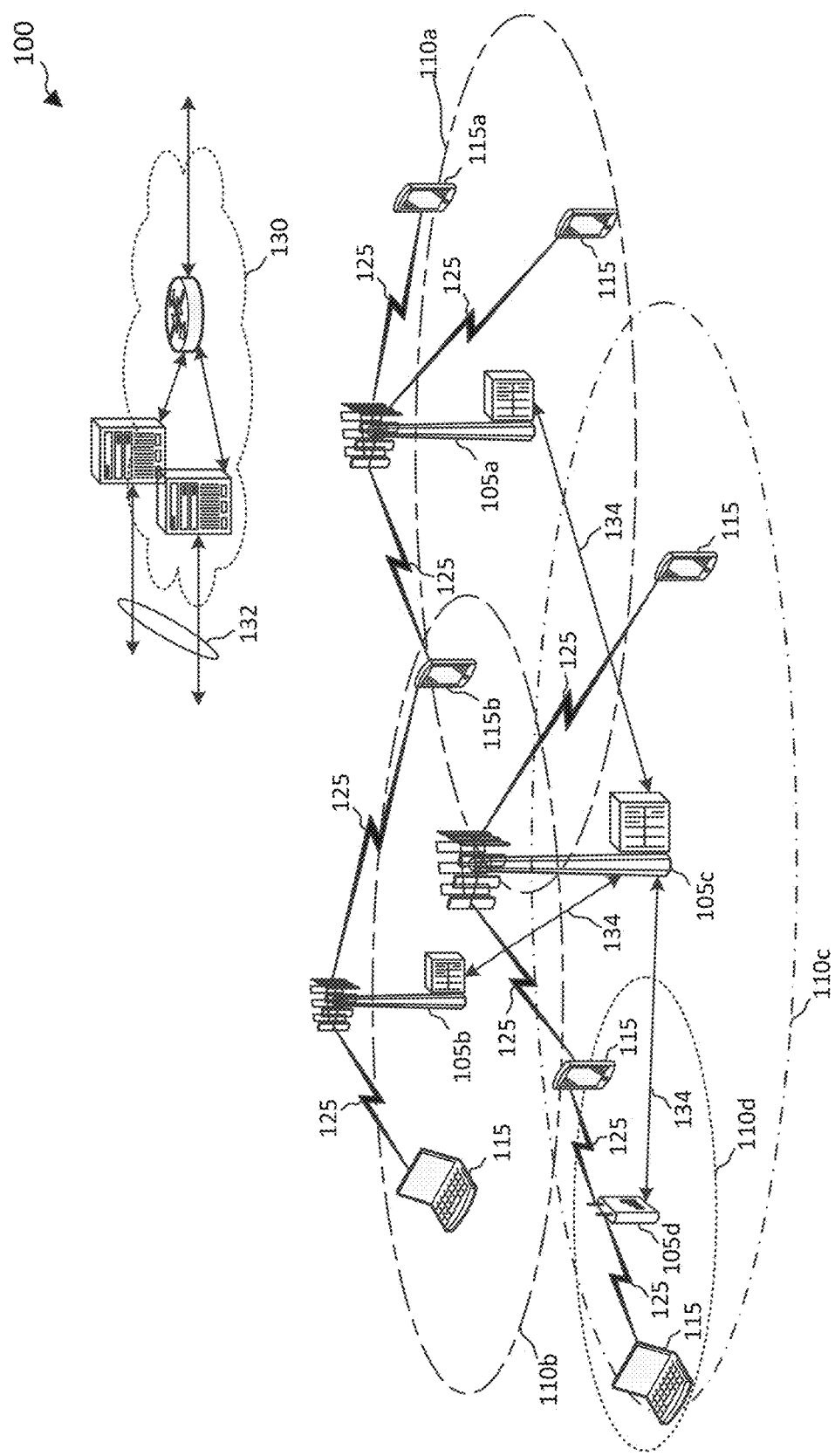
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G) operating in mmWave bands) network.

The present disclosure describes dynamic spectrum access mechanisms in a shared spectrum shared by multiple network operating entities. In a priority-based spectrum sharing scheme, a shared spectrum is time-partitioned into transmission opportunities (TXOPs). Each TXOP is designated for prioritized use by a high priority network operating entity and opportunistic use by low priority network operating entities based on reservations. Each network operating entity may be assigned with an access priority for DL communications and another access priority for UL communications. For example, each TXOP may include a reservation period and a transmission period. Each reservation period may include a pre-scheduling period and a contention period. Each pre-scheduling period may include an orthogonal resource for each network operating entity to transmit a reservation request (RRQ) to reserve a following transmission period for UL or DL communications. Each contention period includes an orthogonal resource for an operator node of a particular access priority to transmit a reservation response (RRS). The orthogonal resources in a pre-scheduling period or a contention period may be 1-DM, TDM, or code-division-multiplexing (CDM) resources. In one embodiment, a contention period may include additional reservation confirmation period for an intended transmitter to transmit a reservation confirmation signal to avoid a missed detection of a high priority RRQ due to hidden node or exposed node issues. In one embodiment, a RRQ may indicate a traffic type or a traffic priority of an intended communication, such as ultra-reliability low latency communication (URLLC) and regular traffic and a corresponding RRS can include the traffic priority received from the RRQ so that resolutions of access priorities can account for traffic priorities.

The disclosed embodiments provide several benefits. For example, the multiplexing of resources in the pre-scheduling period and the contention period can improve bandwidth utilization efficiency. The addition of the reservation confirmation can reduce occurrences of hidden nodes or exposed nodes, and thus may improve both robustness and efficiency of medium sharing. The indication of a traffic priority or traffic type of an intended communication in the RRQ and echoed by the RRS can improve transmission latency for time-critical or mission-critical communications. The disclosed embodiments are suitable for use in heterogeneous network (HetNet) coverage areas including macro cells and small cells. The disclosed embodiments are compatible with any wireless communication protocol.

FIG. 1 illustrates a wireless communication network 100 according to embodiments of the present disclosure. The network 100 includes BSs 105, UEs 115, and a core network 130. In some embodiments, the network 100 operates over a spectrum. The spectrum may be unlicensed or partially licensed to one or more network operating entities. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operating entity. Wireless resources may be partitioned and arbitrated among the different network operating entities for coordinated communication between the network operating entities over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UE 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into sub-bands.

In an embodiment, the BSs 105 can assign or schedule transmission resources (e.g., in the form of time-frequency resource blocks) for DL and UL transmissions in the network 100. The communication can be in the form of radio frames. A radio frame may be divided into a plurality of subframes. In a frequency-division duplexing (FDD) mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are pre-determined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit a channel state information—reference signal (CSI-RS) to enable a UE 115 to estimate a DL channel. Similarly, a UE 115 may transmit a sounding reference signal (SRS) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In an embodiment, a UE 115 attempting to access the network 100 may perform an initial cell search by detecting a primary synchronization signal (PSS) from a BS 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring.

In some embodiments, the UEs 115 and the BSs 105 may be operated by multiple network operators or network operating entities and may operate in a radio frequency spectrum, which may include licensed or unlicensed frequency bands. For example, in the network 100, the BS 105*a* and the UE 115*a* may be associated with one network operating entity, while the BS 105*b* and the UE 115*b* may be associated with another network operating entity. The spectrum may be partitioned into time intervals. Each time interval may be used by a particular network operating entity for communication based on assignments or negotiations (e.g., reservations), as described in greater detail herein. To support coordinated access of the spectrum, a BS 105 or an entity of the core network 130 may act as a central arbitrator to manage access and coordinate the partitioning of resources among different network operating entities operating within the network 100. In some embodiments, the central arbitrator may include a spectrum access system (SAS). In addition, the transmissions from the multiple network operating entities can be time synchronized to facilitate the coordination.

Figure 2:
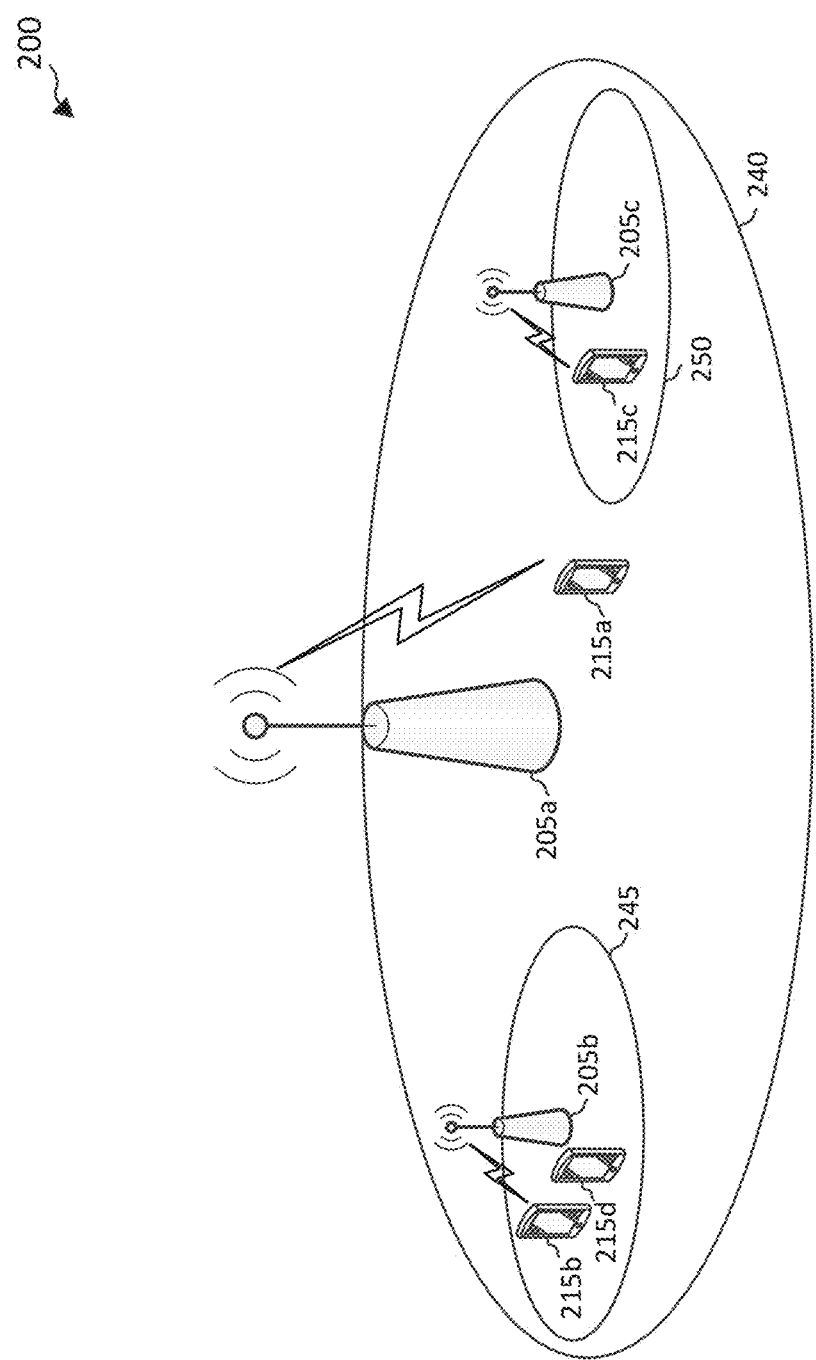
FIG. 2 illustrates an example of a wireless communications network that supports priority-based spectrum access according to embodiments of the present disclosure.

FIG. 2 illustrates an example of a wireless communications network 200 that supports priority-based spectrum access according to embodiments of the present disclosure. The network 200 may be similar to the network 100. FIG. 2 illustrates three BSs 205 and four UEs 215 for purposes of simplicity of discussion, though it will be recognized that embodiments of the present disclosure may scale to many more UEs 215 and/or BSs 205. The BSs 205 and the UEs 215 may be similar to the BSs 105 and the UEs 115, respectively. The BS 205*a* serves the UE 215*a* in a macro cell 240. The BS 205*b* serves the UEs 215*b* and 215*d* in a pico cell 245 within a coverage area of the macro cell 240. The BSs 205*c* serves the UE 215*c* in another pico cell 250 within the coverage area of the macro cell 240. The BSs 205 and the UEs 215 may communicate over the same spectrum.

Due to the different transmission power requirements or power-classes of nodes (e.g., the BSs 205 and the UEs 215) in the macro cell 240 and the pico cells 245 and 250, different power-class nodes may be treated as different network operating entities and assigned with different access priorities for accessing the spectrum to minimize interference. For example, the BS 205*a* and the UE 215*a* may be treated as one network operating entity (e.g., Operator A), the BS 205*b* and 205*c* and the UEs 215*b-d* may be treated as another network operating entity (e.g., Operator B). In some embodiments, the network operating entities may be further assigned with different access priories for different link directions. For example, each network operating entity may be assigned with a DL access priority and a UL access priority, as described in greater detail herein. In some embodiments, the network 200 may support dynamic TDD. For example, the UEs 215 may dynamically switch the link priority from a DL direction to an UL direction. In the present disclosure, the terms network operating entity and operator may be used interchangeably and may be associated with a particular priority and/or a particular power class.

The spectrum may be partitioned by classifying time resources into periods and assigning the periods to different network operating entities. In some embodiments, certain time periods may be allocated for exclusive use by a particular network operating entity. Other time periods may be allocated for prioritized use or guaranteed use by a particular network operating entity, but may also be for opportunistic use by the other network operating entities. In yet other examples, certain time periods may be designated for opportunistic use by all network operating entities, for example, to enable additions of network operating entities into the network 200 in a non-centralized manner. The claiming of the time periods for prioritized use or opportunistic use may be based on reservations, as described in greater detail herein.

Figure 3:
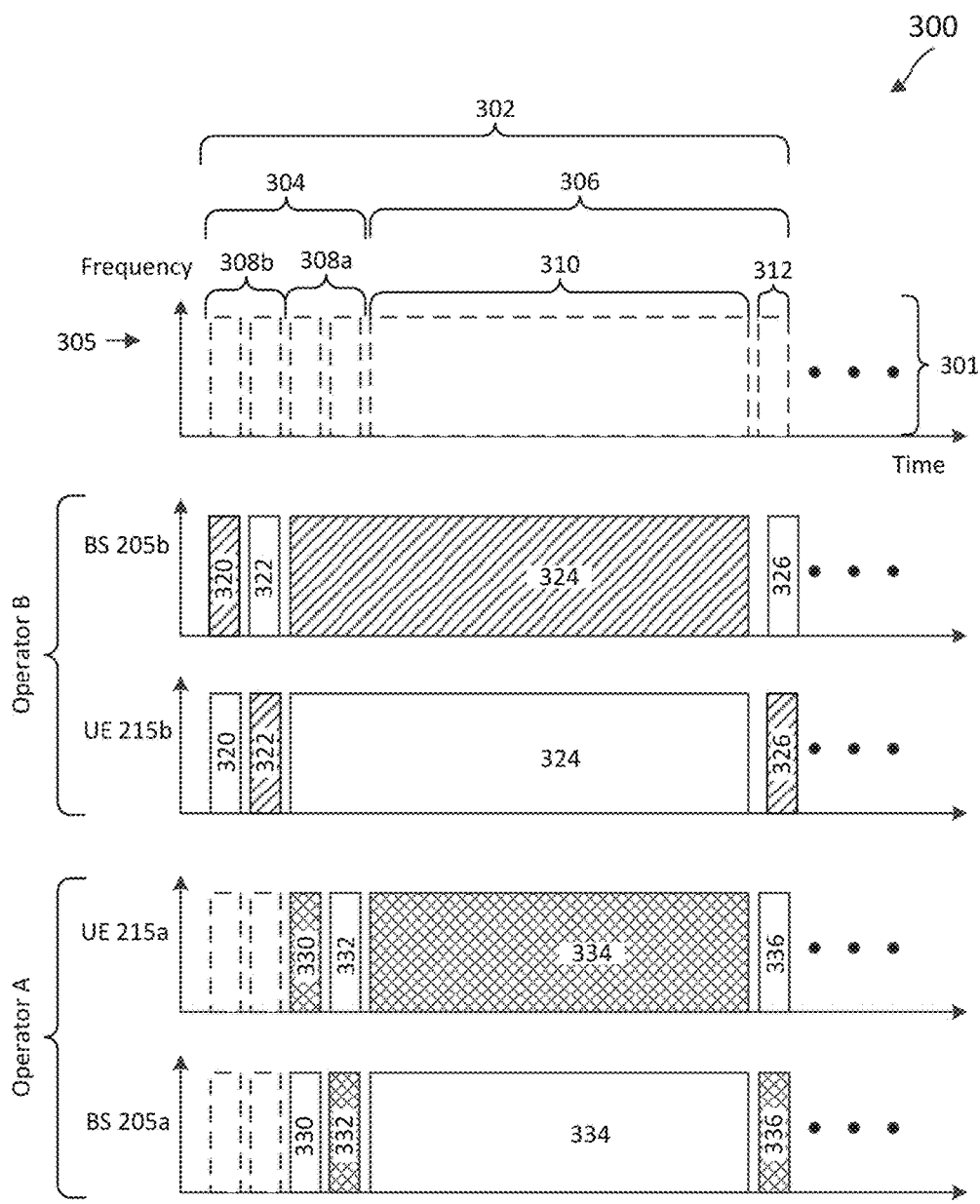
FIG. 3 illustrates a priority-based spectrum sharing scheme according to embodiments of the present disclosure.

FIG. 3 illustrates a priority-based spectrum sharing scheme 300 according to embodiments of the present disclosure. The x-axis represents time in some constant units. The y-axis represents frequency in some constant units. The scheme 300 may be employed by the BSs 105 and 205 and the UEs 115 and 215. While the scheme 300 illustrates coordinated spectrum access for two different network operating entities (e.g., Operator A and Operator B), the scheme 300 can be applied to any suitable number of network operating entities. In FIG. 3, patterned boxes represent transmit signals and the empty boxes represent receive signals. The dashed boxes are included to show the transmission and/or reception with reference to the TXOP structure 305 (e.g., without signal transmission or reception)

The spectrum spans a frequency band 301 and is time-partitioned into a plurality of TXOPs 302 as shown in the TXOP structure 305. Each TXOP 302 includes a reservation period 304 and a transmission period 306. The reservation period 304 includes a plurality of clear channel assessment (CCA) periods 308. The CCA periods 308 and the transmission period 306 may have fixed durations. For example, each CCA period 308 may include one or more OFDM symbols, and each transmission period 306 may include one or more subframes. In some embodiments, the TXOPs 302 may be defined in units of LTE slots (e.g., about 250 microseconds (μs) long). The TXOP structure 305 is pre-determined and known by all network operating entities sharing the shared spectrum. The network operating entities may be time-synchronized when operating in the shared spectrum.

Each CCA period 308 is assigned to a particular network operating entity. For example, the CCA periods 308a and 308b are assigned to Operators A and B, respectively. The number of CCA periods 308 in a TXOP 302 may be dependent on the number of network operating entities in a network. For example, a network with N network operators may include up to N CCA periods 308 in a TXOP 302. The CCA periods 308 can be arranged in a TXOP 302 based on communication or access priorities of the network operating entities, for example, in a descending order. Thus, each TXOP 302 is prioritized for use by a highest priority network operating entity, and may be utilized by lower priority network operating entities on an opportunistic basis if the prioritized network operating entity does not utilize the resources. In addition, the priorities of the network operating entities may rotate (e.g., in a round-robin fashion) among TXOPs 302.

The transmission period 306 can be used for UL and/or DL transmissions. For example, the transmission period 306 includes two portions 310 and 312. The portion 310 can have a longer duration than the portion 312. For DL-centric communications, the portion 310 can be assigned for DL transmissions and the portion 312 can be assigned for UL transmissions. Alternatively, for UL-centric communications, both the portions 310 and 312 can be assigned for UL transmissions.

As an example, the BS 205b transmits a RRQ signal 320 in the assigned CCA period 308b to reserve the following transmission period 306, for example, for a DL-centric transmission. In response, the UE 215b transmits a RRS signal 322 in the CCA period 308b. The RRQ signal 320 can be pre-determined preambles or request-to-transmit (RTS) signals. The RRS signal 322 can be pre-determined preambles or clear-to-transmit (CTS) signals. In some embodiments, the RRQ signal 320 can include a DL transmission trigger (e.g., a DL control signal carrying DL scheduling information) and the RRS signal 322 can include a SRS. Subsequently, the BS 205b communicates with the UE 215b in the transmission period 306. The transmission period 306 may begin after the CCA period 308b (e.g., occupying the low-priority CCA period 308a). The BS 205b transmits a DL data signal 324, for example, based on the DL scheduling information, in the portion 310. The UE 215b transmits a UL control signal 326, for example, carrying scheduling request (SR) and hybrid automatic repeat request (HARQ) information. The DL signal 324 may carry DL data for the UE 215b.

The BS 205a and the UE 215a may listen to the channel during the high-priority CCA period 308b. Upon detection of a RRQ signal 320 from the BS 205b or a RRS signal 322 from the UE 215b, the BS 205a may refrain from transmitting in the transmission period 306. However, when no reservation is detected in the CCA period 308b, the BS 205a may opportunistically use the transmission period 306 by transmitting a RRQ signal 330 in the CCA period 308a and the UE 215b may respond with a RRS signal 332 in the assigned CCA period 308a. The BS 205a and the UE 215a may communicate in the transmission period 306 as shown by the DL data signal 334 and the UL control signal 336. As can be seen, the number of CCA periods 308 increases as the number of network operating entities increases, and thus the scheme 300 may have a substantial bandwidth overhead.

Figure 4:
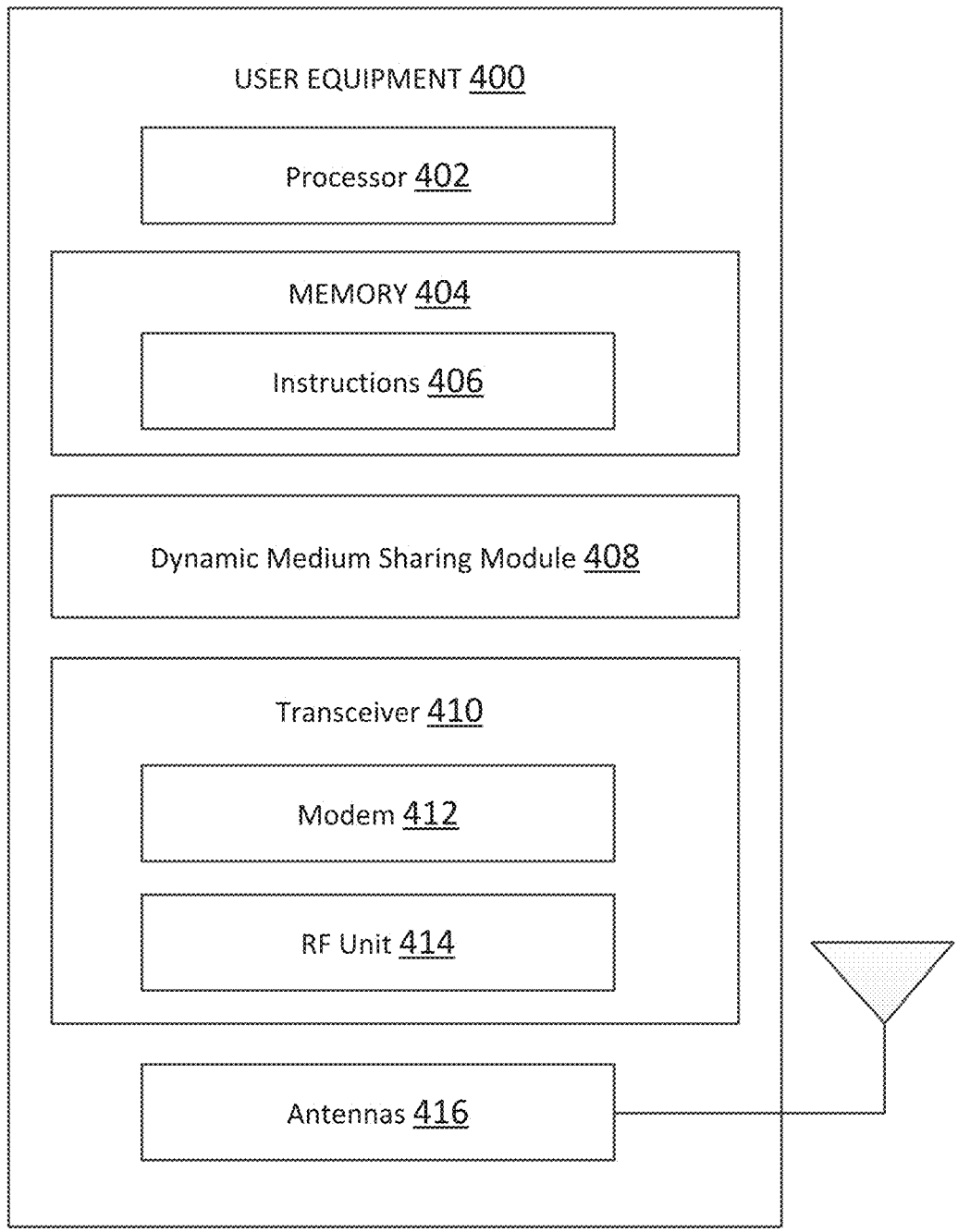
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 or 215 as discussed above. As shown, the UE 400 may include a processor 402, a memory 404, a dynamic medium sharing module 408, a transceiver 410 including a modem subsystem 412 and a radio frequency (RF) unit 414, and an antenna 416. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 215 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The dynamic medium sharing module 408 may be used for various aspects of the present disclosure. For example, the dynamic medium sharing module 408 is configured to identify transmission opportunities in a spectrum, perform channel listening, reserve transmission opportunities in a spectrum communication, and perform dynamic TDD, as described in greater detail herein.

As shown, the transceiver 410 may include the modem subsystem 412 and the RF unit 414. The transceiver 410 can be configured to communicate bi-directionally with other devices, such as the BSs 105 and 205. The modem subsystem 412 may be configured to modulate and/or encode the data from the memory 404 and/or the dynamic medium sharing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 215 or a BS 205. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 215 to enable the UE 215 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of clear-to-transmit (CTS) signals according to embodiments of the present disclosure. The antenna 416 may further receive data messages transmitted from other devices. This may include, for example, reception of request-to-transmit (RTS) and/or CTS signals according to embodiments of the present disclosure. The antenna 416 may provide the received data messages for processing and/or demodulation at the transceiver 410. Although FIG. 4 illustrates antenna 416 as a single antenna, antenna 416 may include multiple antennas of similar or different designs in order to sustain multiple transmission links. The RF unit 414 may configure the antenna 416.

Figure 5:
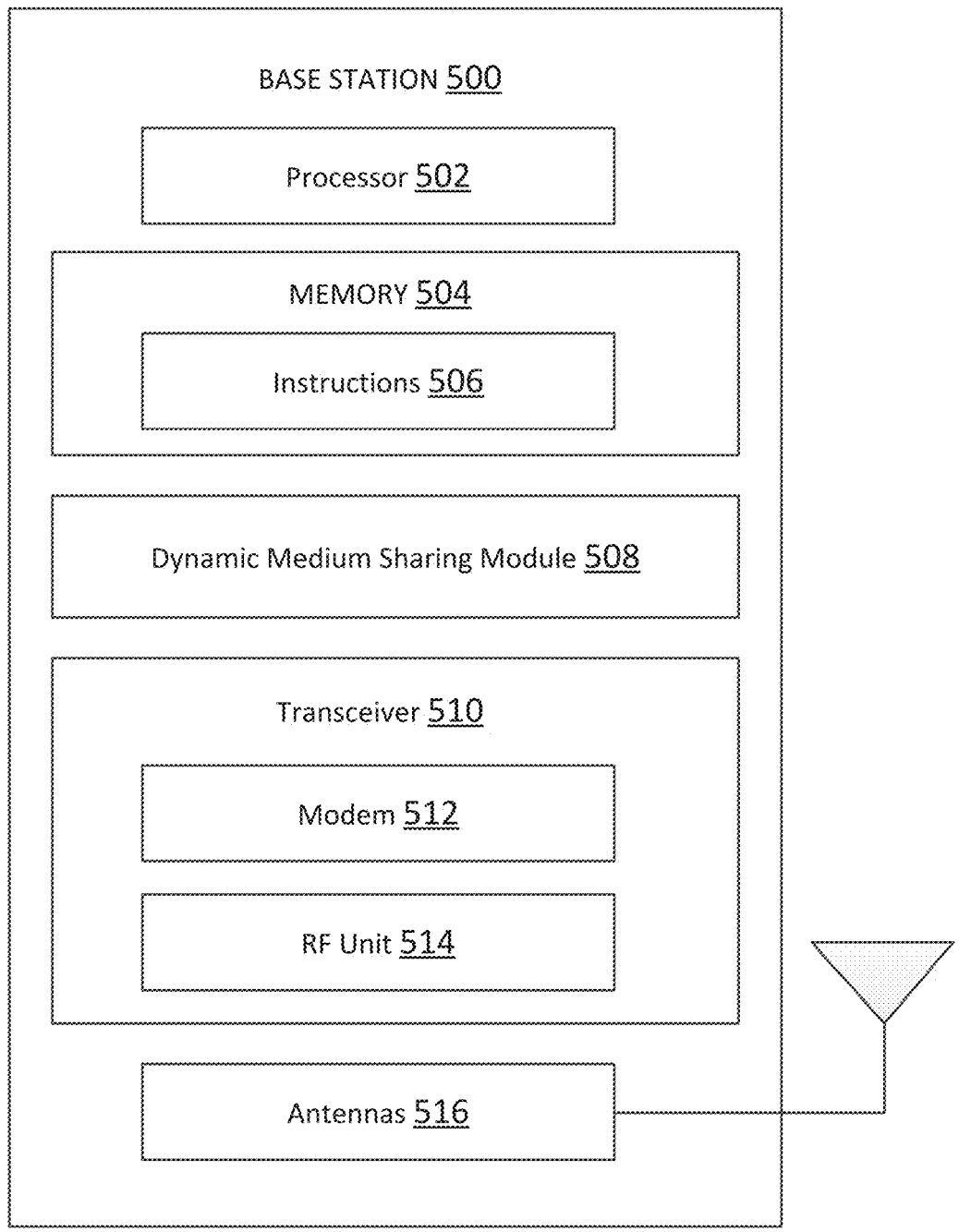
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 or 205 as discussed above. A shown, the BS 500 may include a processor 502, a memory 504, a dynamic medium sharing module 508, a transceiver 510 including a modem subsystem 512 and a RF unit 514, and an antenna 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The dynamic medium sharing module 508 may be used for various aspects of the present disclosure. For example, the dynamic medium sharing module 508 is configured to identify transmission opportunities in a spectrum, perform channel listening, and reserve time transmission opportunities in a spectrum, as described in greater detail herein.

As shown, the transceiver 510 may include the modem subsystem 512 and the RF unit 514. The transceiver 510 can be configured to communicate bi-directionally with other devices, such as the UEs 115 and 215 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 215. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 205 to enable the BS 205 to communicate with other devices.

The RF unit 514 may provide the modulated and/or processed data, e.g. data packets (or, more generally, data messages that may contain one or more data packets and other information), to the antenna 516 for transmission to one or more other devices. This may include, for example, transmission of information to complete attachment to a network and communication with a camped UE 215 according to embodiments of the present disclosure. The antenna 516 may further receive data messages transmitted from other devices and provide the received data messages for processing and/or demodulation at the transceiver 510. Although FIG. 5 illustrates antenna 516 as a single antenna, antenna 516 may include multiple antennas of similar or different designs in order to sustain multiple transmission links.

Figure 6:
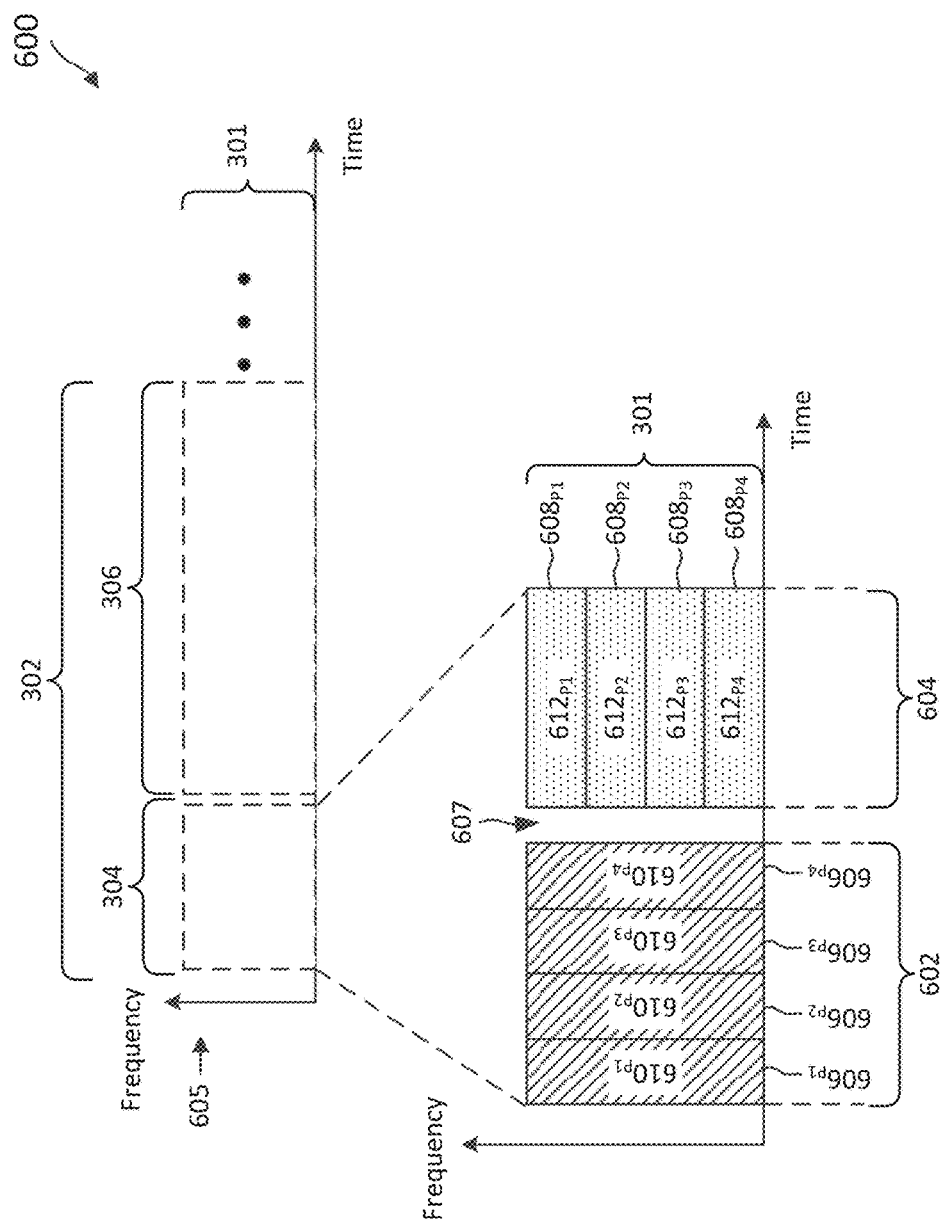
FIG. 6 illustrates a priority-based spectrum access scheme with frequency-division multiplexing (FDM) contentions according to embodiments of the present disclosure.
Figure 7:
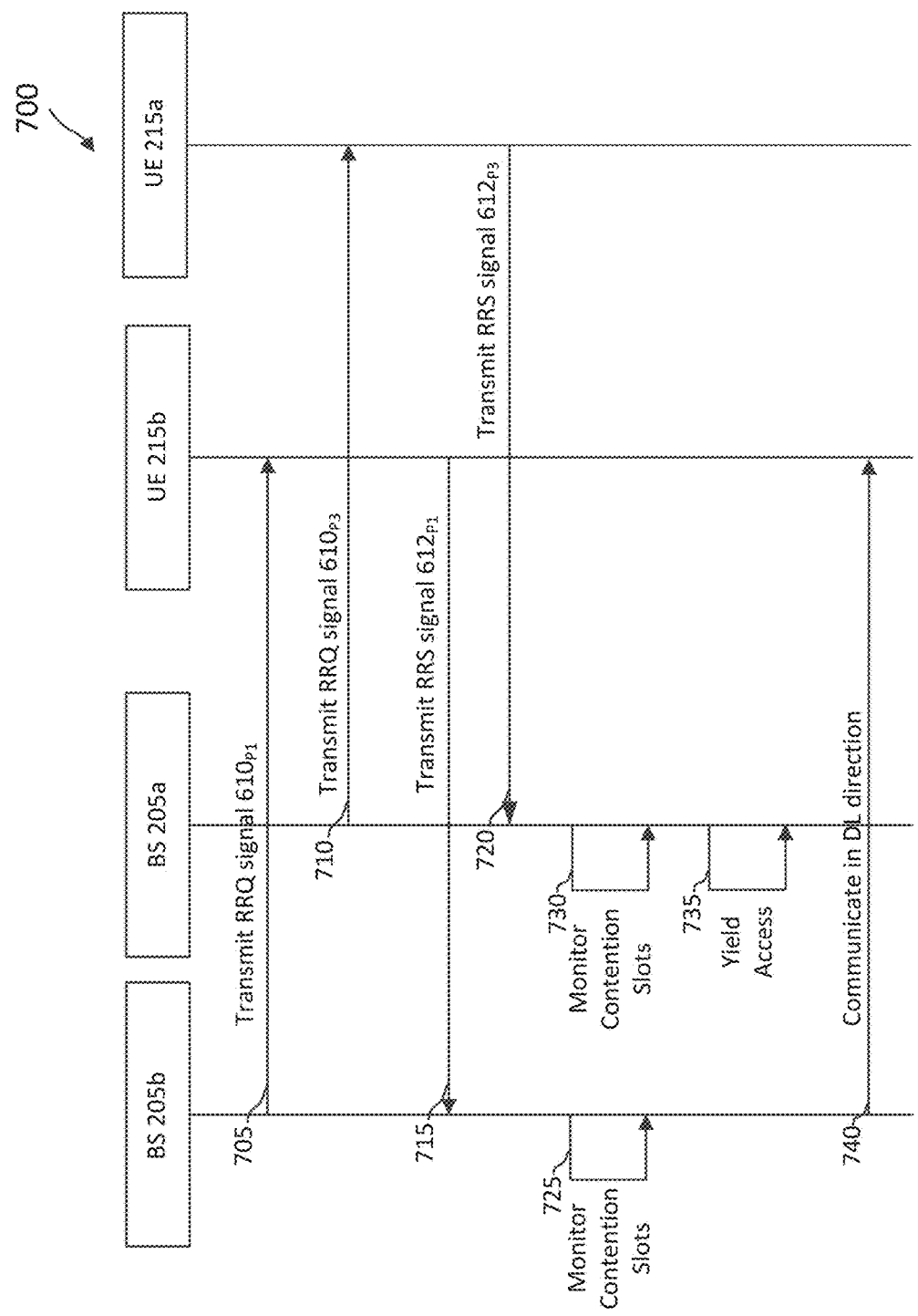
FIG. 7 illustrates a signaling diagram of a method for dynamic spectrum sharing with FDM contentions according to embodiments of the present disclosure.
Figure 8:
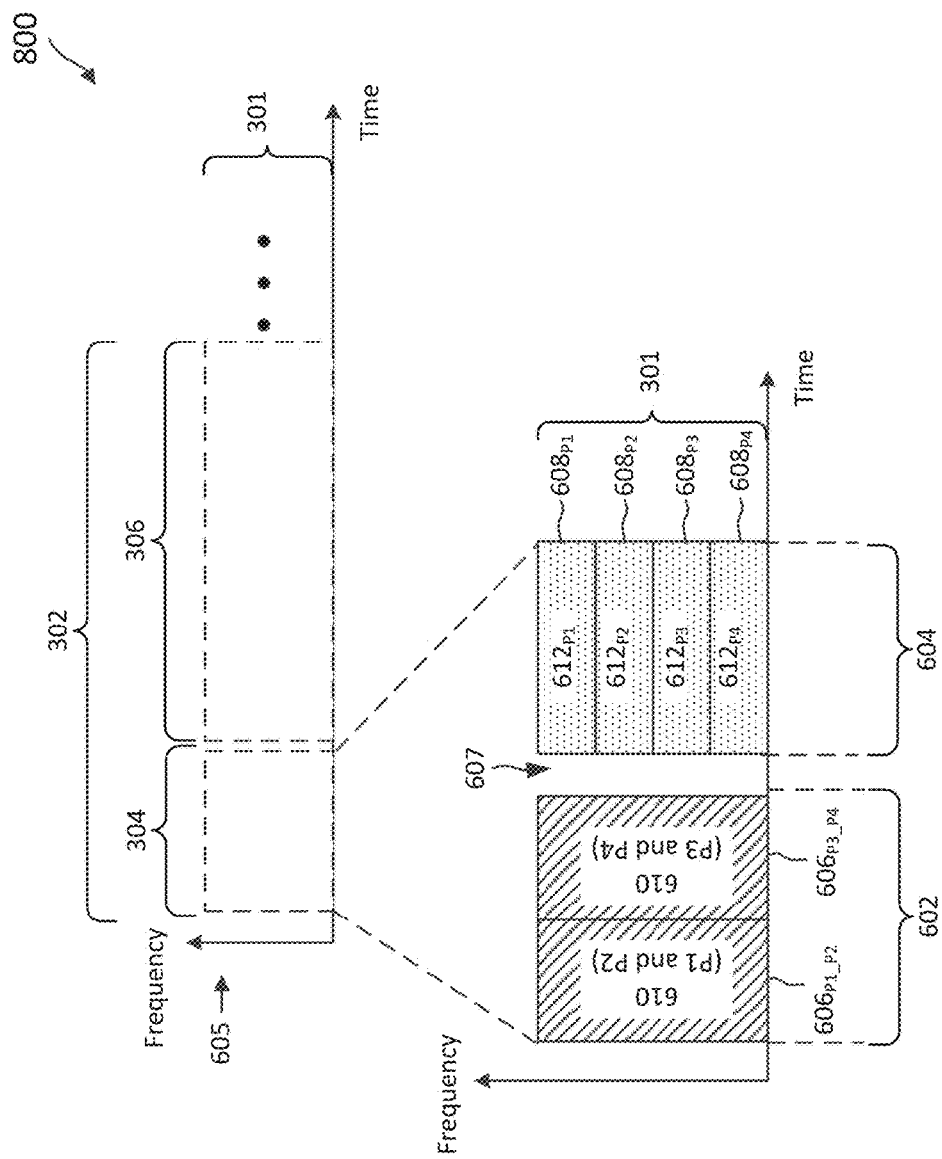
FIG. 8 illustrates a priority-based spectrum access scheme with FDM contentions according to embodiments of the present disclosure.
Figure 9:
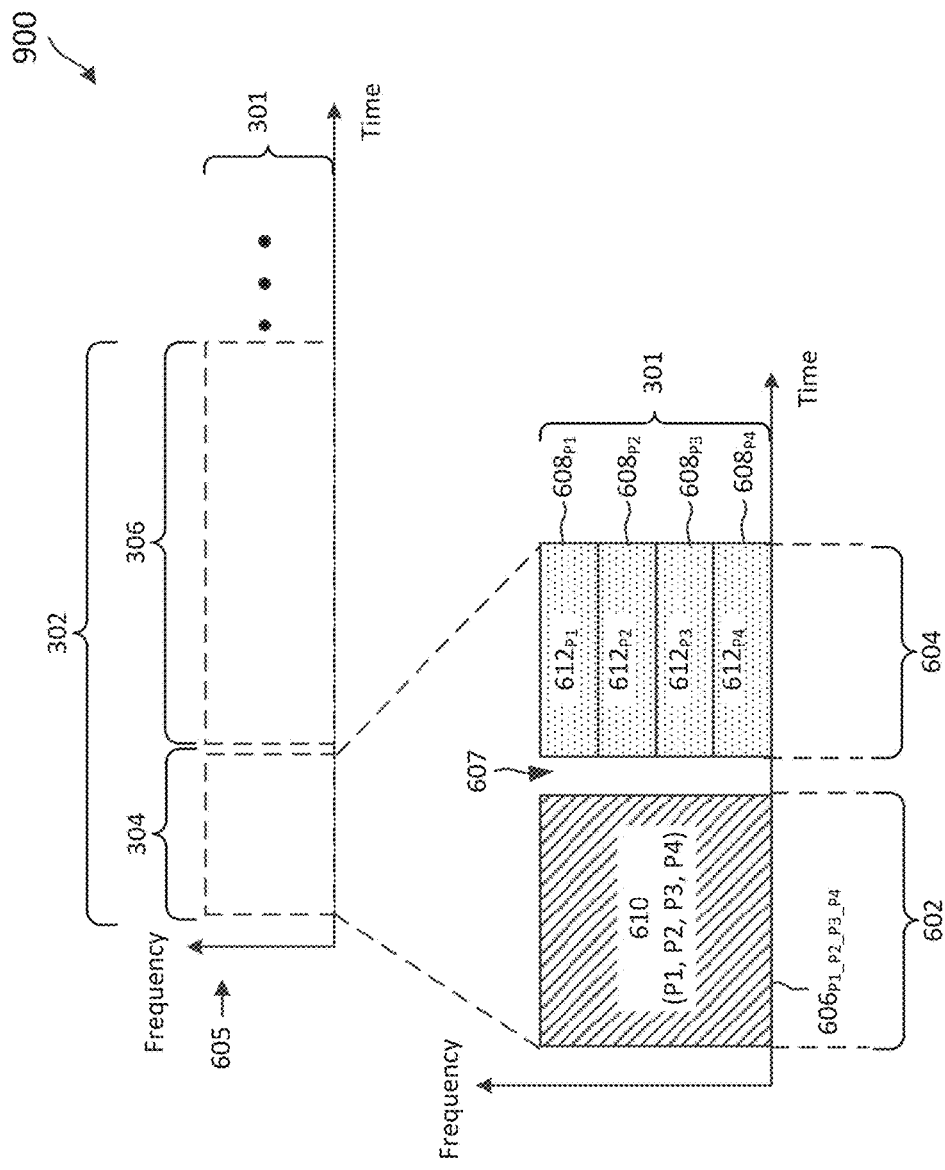
FIG. 9 illustrates a priority-based spectrum access scheme with FDM contentions according to embodiments of the present disclosure.

FIGS. 6-9 illustrate various dynamic medium or spectrum access mechanisms with FDM contentions and may be employed by the BSs 105, 205, and 500 and the UEs 115, 215, and 400. FIGS. 6-9 illustrate dynamic medium access for two network operating entities (e.g., Operator A and Operator B) for purposes of simplicity of discussion, though it will be recognized that embodiments of the present disclosure may scale to many more UEs 115, 215, and 400 and/or BSs 105, 205, and 500. In FIGS. 6, 8, and 9, the x-axes represent time in some constant units, and the y-axes represent frequency in some constant units.

FIG. 6 illustrates a priority-based spectrum access scheme 600 with FDM contentions according to embodiments of the present disclosure. The scheme 600 has a TXOP structure 605 similar to the TXOP structure 305. However, the reservation period 304 is divided into a pre-scheduling period 602 and a contention period 604. The pre-scheduling period 602 and the contention period 604 are separated by a time gap or a switching period 607. The switching period 607 provides a guard time to allow a BS or a UE to switch from a transmit mode to a receive mode or from a UL direction to a DL direction. It should be noted that the reservation period 304 and the transmission period 306 are also separated by a time gap similar to the switching period 607.

The pre-scheduling period 602 includes a plurality of pre-defined pre-scheduling slots 606. The pre-scheduling slots 606 are time-division multiplexed (e.g., with orthogonal resources) in the pre-scheduling period 602. Each pre-scheduling slot 606 is associated with a particular access priority. For example, the pre-scheduling period 602 may include M number of pre-scheduling slots 606 to allow for M access priorities, where M is a positive integer. Each pre-scheduling slot 606 is designated for transmission of a RRQ signal 610 by a scheduling node (e.g., the BSs 105 and 205) of the particular access priority to reserve a following transmission period 306 for communication. The RRQ signal 610 may include a pre-determined preamble and a pre-schedule (e.g., a DL grant or a UL grant) for the communication. The access priorities may be assigned to different operators, different power class nodes, and/or different link directions (e.g., UL and DL). For example, each network operating entity may be assigned with an access priority for DL communications and an access priority for UL communications, as described in greater detail herein.

The contention period 604 includes a plurality of pre-defined contention slots 608. The contention slots 608 are frequency-division multiplexed (e.g., with orthogonal resources) in the contention period 604. Similar to the pre-scheduling slots 606, each contention slot 608 is associated with a particular access priority. For example, the contention period 604 may include N number of contention slots 608 to allow for N access priorities, where N is a positive integer. In some embodiments, N equals to M. Each contention slot 608 is designated for transmission of a RRS signal 612 by an intended receiving node of the particular access priority. For example, an intended receiving node may be a BS for UL communication or a UE (e.g., the UEs 115 and 215) for DL communication. The RRS signal 620 may include at least one of a pre-determined preamble, a CSI-RS, or a SRS. For example, when the intended receiving node is a BS, the BS may send a RRS signal 620 including a CSI-RS. When the intended receiving node is a UE, the UE may send a RRS signal 620 including a SRS.

The scheme 600 allows for concurrent reservations. For example, a scheduling node may transmit a RRQ signal 610 regardless of whether a high priority scheduling node has transmitted a RRQ signal 610. An intended receiving node may respond to a RRQ signal 610 by transmitting a RRS signal 612 unconditionally, for example, without listening to the channel for high priority reservations. As shown, all intended receiving nodes may transmit RRS signals 612 at the same time during the contention period 604 using corresponding contention slots 608 (e.g., with different frequency resources). The RRS signal 612 may carry information associated with path-loss and tolerable Internet of Things (IoT) from lower priority links. An intended transmitting node may monitor the contention slots 608 to determine whether to proceed with the transmission as reserved or yield spectrum access.

As shown, the scheme 600 supports 4 priorities, denoted as P1, P2, P3, and P4 in decreasing priority order. P1 may be assigned to Operator B for DL communication. P2 may be assigned to Operator B for UL communication. P3 may be assigned to Operator A for DL communication. P4 may be assigned to Operator A for UL communication. The pre-scheduling slots $606_{P1}$, $606_{P2}$, $606_{P3}$, and $606_{P4}$ are designated for the access priorities P1, P2, P3, and P4, respectively. Similarly, the contention slots $608_{P1}$, $608_{P2}$, $608_{P3}$, and $608_{P4}$ may be designated for the access priorities P1, P2, P3, and P4, respectively. Thus, an operator node (e.g., the transmitting node) may monitor for RRS signals 612 in the contention slots 608 and yield access to a higher priority operator node. In addition, the operator node may yield access to another operator node of the same priority, but with a higher link priority.

FIG. 7 illustrates a signaling diagram of a method 700 for dynamic spectrum sharing with FDM contentions according to embodiments of the present disclosure. Steps of the method 700 can be executed by a computing device (e.g., a processor, processing circuit, and/or other suitable component) of a wireless communication device, such as the BSs 105, 205, and 500 and the UEs 115, 215, and 400. The method 700 may employ similar mechanisms as in the scheme 600 described with respect to FIG. 6. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 705, the BS 205b transmits a RRQ signal $610_{P1}$ in the pre-scheduling slot $606_{P1}$ to reserve the transmission period 306 for DL communication with the UE 215b. For example, the RRQ signal $610_{P1}$ may include a DL grant for the UE 215b in the transmission period 306.

At step 710, the BS 205a transmits a RRQ signal $610_{P3}$ in the pre-scheduling slot $606_{P3}$ to reserve the transmission period 306 for DL communication with the UE 215a. For example, the RRQ signal $610_{P3}$ may include a DL grant for the UE 215a in the transmission period 306.

At step 715, upon receiving the RRQ signal $610_{P1}$, the UE 215b may respond with a RRS signal $612_{P1}$ in the contention slot $608_{P1}$ unconditionally. At step 720, upon receiving the RRQ signal $610_{P3}$, the UE 215a may respond with a RRS signal $612_{P3}$ in the slot contention $608_{P3}$ unconditionally. At step 725, the BS 205b monitors the contention slots 608 and detected the RRS signals $612_{P1}$ at the contention slot $608_{P1}$ and RRS signal $612_{P3}$ at the contention slot $608_{P3}$. At step 730, the BSs 205a monitors the contention slots 608 and detected the RRS signals $612_{P1}$ at the contention slot $608_{P1}$ and RRS signal $612_{P3}$ at the contention slot $608_{P3}$. The steps of 715, 720, 725, and 730 are concurrent steps.

At step 735, the BS 205a determines that there is a higher priority reservation based on the RRS signal $612_{P1}$ and yield access to the higher priority reservation. At step 740, the BS 205b proceeds with DL communication with the UE 215b in the transmission period 306. While the method 700 illustrates spectrum access between nodes of two operators, the same mechanisms may be applied to nodes of the same operators in different link directions (e.g., between a P1 node and a P2 node).

In some embodiments, a RRQ signal 610 may further indicate a traffic priority for the DL grant or the UL grant of the intended communication. For example, traffic priorities may include a URLLC traffic priority and a regular traffic priority. URLLC traffic may be time-critical, whereas regular traffic may not be as time-sensitive. Thus, the URLLC traffic priority may be higher than the regular traffic priority. An intended receiving node may echo the traffic priority in a RRS signal 612. An intended transmitting node may determine whether to yield access based on the access priorities and the traffic priorities detected from the RRS signals 612. For example, when a transmitting node has regular traffic, the transmitting node may yield access to a higher priority node with regular traffic or a lower priority node with URLLC traffic. When a transmitting node has URLLC traffic, the transmitting node may yield access to a higher priority node with URLLC traffic. Thus, a transmitting node may resolve priorities in the following order:

P1 URLLC>P2 URLLC>P3 URLLC>P4 URLLC>P1 regular>P2 regular>P3 regular>P4 regular.

FIG. 8 illustrates a priority-based spectrum access scheme 800 with FDM contentions according to embodiments of the present disclosure. The scheme 800 is similar to the scheme 600, but assigns orthogonal resources to operators for RRQ transmissions and allows DL and UL reservations or RRQs within an operator to be transmitted in the same pre-scheduling slot 606. As shown in the scheme 800, the pre-scheduling period 602 includes half the number of pre-scheduling slots 606 when compared to the scheme 600. Thus, the scheme 800 may be more efficient in bandwidth utilization. Similar to the scheme 600, each operator may be assigned with different access priorities for UL communications and DL communications. However, a scheduling node (e.g., the BSs 105, 205, and 500) may use the same pre-scheduling slot 606 for transmission of a RRQ signal 610 for UL reservation or DL reservation. For example, an operator B scheduling node (e.g., the BS 205b) may transmit a RRQ signal 610 for a UL reservation or a DL reservation in the contention slot $606_{P1\_P2}$ and an operator A (e.g., the BS 205a) scheduling node may transmit a RRQ signal 610 for a UL reservation or a DL reservation in the contention slot $606_{P3\_P4}$. In operation, the BS 205a and 205b and the UEs 215a and 215b may employ similar mechanisms as in the method 700 for spectrum sharing.

FIG. 9 illustrates a priority-based spectrum access scheme 900 with FDM contentions according to embodiments of the present disclosure. Similar to the scheme 800, the scheme 900 assigns orthogonal resources to operators for RRQ transmissions and applies reuse for DL and UL reservations or RRQs within an operator. As shown, the pre-scheduling period 602 includes a single pre-scheduling slot $606_{P1\_P2\_P3\_P4}$. Each operator may be assigned with an orthogonal resource in the pre-scheduling slot 606 for DL and UL RRQ transmissions. The orthogonal resources within the pre-scheduling period 602 may be FDM, TDM or code-division multiplexing (CDM) resources. Similar to the schemes 600 and 800, each operator may be assigned with different access priorities for UL communications and DL communications. A scheduling node (e.g., the BSs 105, 205, and 500) of an operator may transmit a RRQ signal 610 for UL reservation or DL reservation using an orthogonal resource assigned to the operator. In operation, the BS 205a and 205b and the UEs 215a and 215b may employ similar mechanisms as in the method 700 for spectrum sharing.

Figure 11:
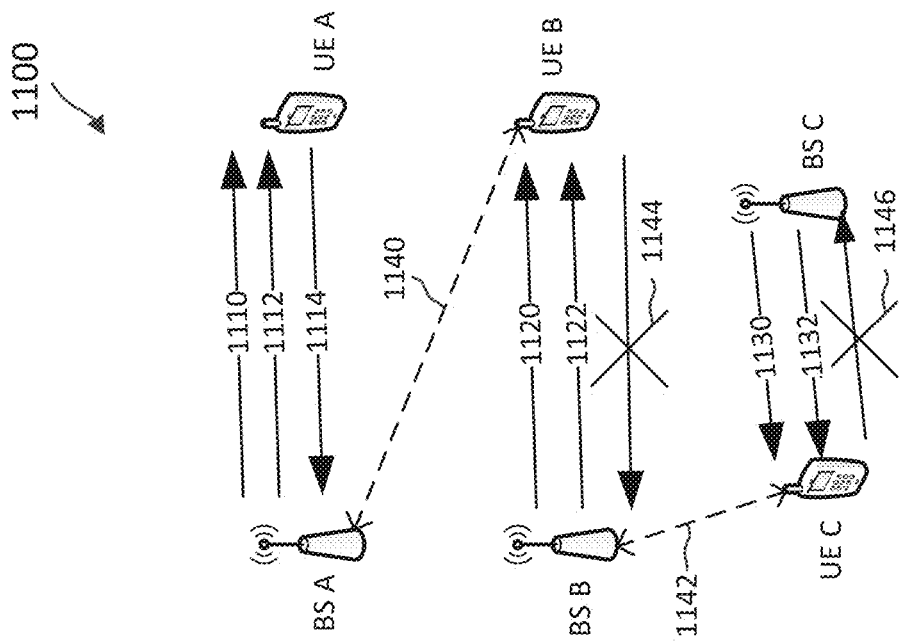
FIG. 11 illustrates a spectrum access scenario according to embodiments of the present disclosure.
Figure 10:
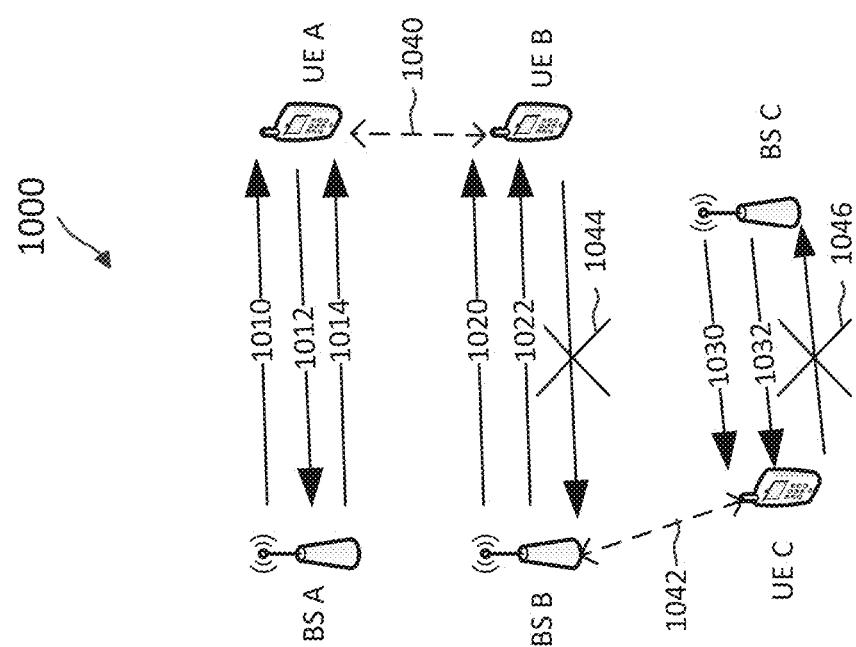
FIG. 10 illustrates a spectrum access scenario according to embodiments of the present disclosure.

The schemes 600, 800, and 900 and the method 700 may perform well in a network (e.g., the networks 100 and 200) with two access priorities, but may cause inefficiency with three access priorities. FIGS. 10 and 11 show constraints of the schemes 600, 800, and 900 and the method 700. FIGS. 10 and 11 are illustrated with BSs A, B, and C similar to the BSs 105, 205, and 500 and UEs A, B, and C similar to the UEs 115, 215, and 400. For example, BS A and BS B belong to a high priority operator and BS C belongs to a low priority operator.

FIG. 10 illustrates a spectrum access scenario 1000 according to embodiments of the present disclosure. In the scenario 1000, the high priority operator has a default link priority of DL, where DL communication has a higher access priority than UL communication. As an example, in a pre-scheduling period 602, the BS A transmits a first RRQ signal (e.g., the RRQ signal 610) for DL communication with the UE A as shown by the arrow 1010, the BS B transmits a second RRQ signal for UL communication with the UE B as shown by the arrow 1020, and the BS C transmits a third RRQ signal for UL communication with the UE C as shown by the arrow 1030. In a following contention period 604, the UE A (e.g., the target receiver) responds to the first RRQ signal with a first RRS signal (e.g., the RRS signal 612) as shown by the arrow 1012, the BS B (e.g., the target receiver) responds to the second RRQ signal with a second RRS signal as shown by the arrow 1022, and the UE C (e.g., the target receiver) responds to the third RRQ signal with a third RRS signal as shown by the arrow 1032. As described above, the transmissions of the first, second, and third RRQ signals and the first, second, and third RRS signals are unconditional transmissions.

Since BS A has the highest access priority, the BS A may proceed with the intended DL communication with the UE A as shown by the arrow 1014. The UE B may detect the first RRS signal transmitted by the UE A as shown by the arrow 1040, and thus may refrain from UL communication with the BS B as shown by cross 1044. The UE C may detect the second RRS signal transmitted by the BS B as shown by the arrow 1042, and thus may refrain from UL communication with the BS C as shown by cross 1046. Since the UE C cannot detect the first RRS signal transmitted by the UE A, the UE C can potentially transmit without causing significant interference to the DL transmission of the BS A. Thus, the blind transmission of the second RRS signal by the BS B without monitoring for higher priority reservations causes the UE C to unnecessarily yield access.

FIG. 11 illustrates a spectrum access scenario 1100 according to embodiments of the present disclosure. In the scenario 1100, the higher operator has a default link priority of UL, where UL communication has a higher access priority than DL communication. As an example, in a pre-scheduling period 602, the BS A transmits a first RRQ signal for UL communication with the UE A as shown by the arrow 1110, the BS B transmits a second RRQ signal for UL communication with the UE B as shown by the arrow 1120, and the BS C transmits a third RRQ signal for UL communication with the UE C as shown by the arrow 1130. In a following contention period 604, the BS A responds to the first RRQ signal with a first RRS signal as shown by the arrow 1112, the BS B responds to the second RRQ signal with a second RRS signal as shown by the arrow 1122, and the UE C responds to the third RRQ signal with a third RRS signal as shown by the arrow 1132. As described above, the transmissions of the first, second, and third RRQ signals and the first, second, and third RRS signals are unconditional transmissions.

Since UE A has the highest access priority, the BS A may proceed with the intended UL communication with the BS A as shown by the arrow 1114. The UE B may detect the first RRS signal transmitted by the UE A as shown by the arrow 1140, and thus may refrain from UL communication with the BS B as shown by cross 1144. The UE C may detect the second RRS signal transmitted by the BS B as shown by the arrow 1142, and thus may refrain from UL communication with the BS C as shown by cross 1146. Similar to the scenario 1000, since the UE C cannot detect the first RRS signal transmitted by the UE A, the UE C can potentially transmit without causing significant interference to the UL transmission of the UE A. The blind transmission of the second RRS signal by the BS B without monitoring for higher priority reservations causes the UE C to unnecessarily yield access.

Figure 12:
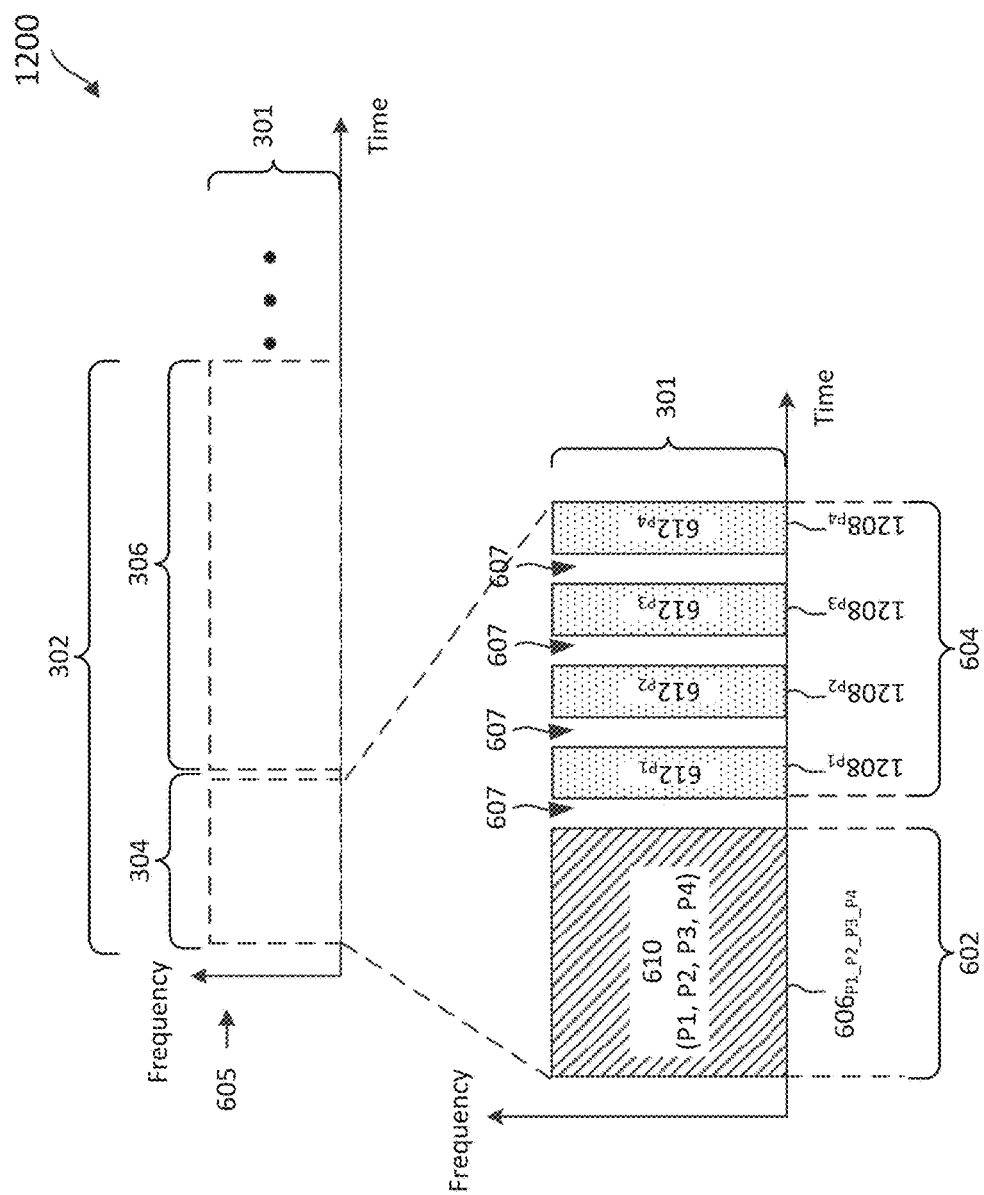
FIG. 12 illustrates a priority-based spectrum access scheme with time-division multiplexing (TDM) contentions according to embodiments of the present disclosure.
Figure 13:
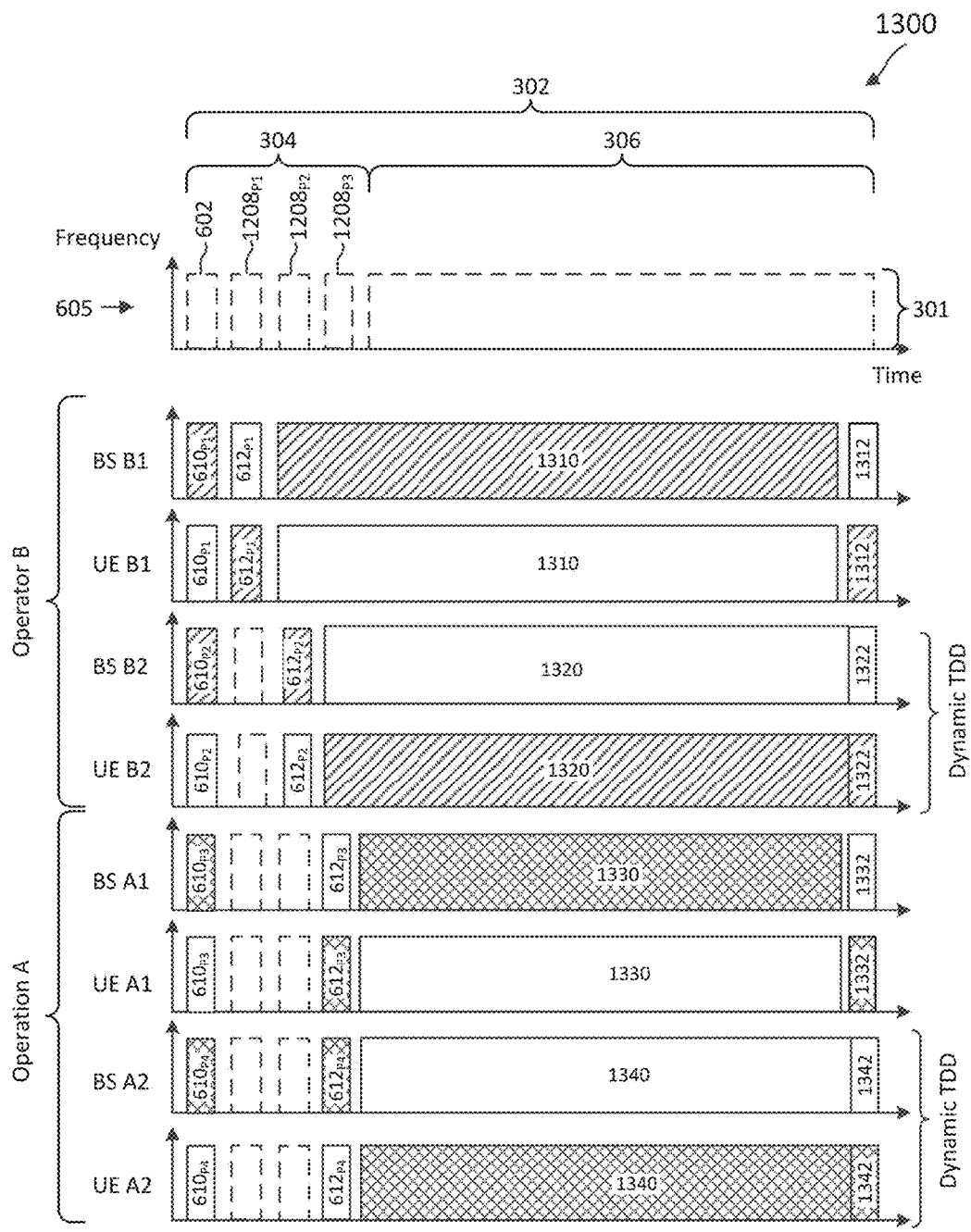
FIG. 13 illustrates a priority-based spectrum access scheme with dynamic time-division duplexing (TDD) according to embodiments of the present disclosure.
Figure 14:
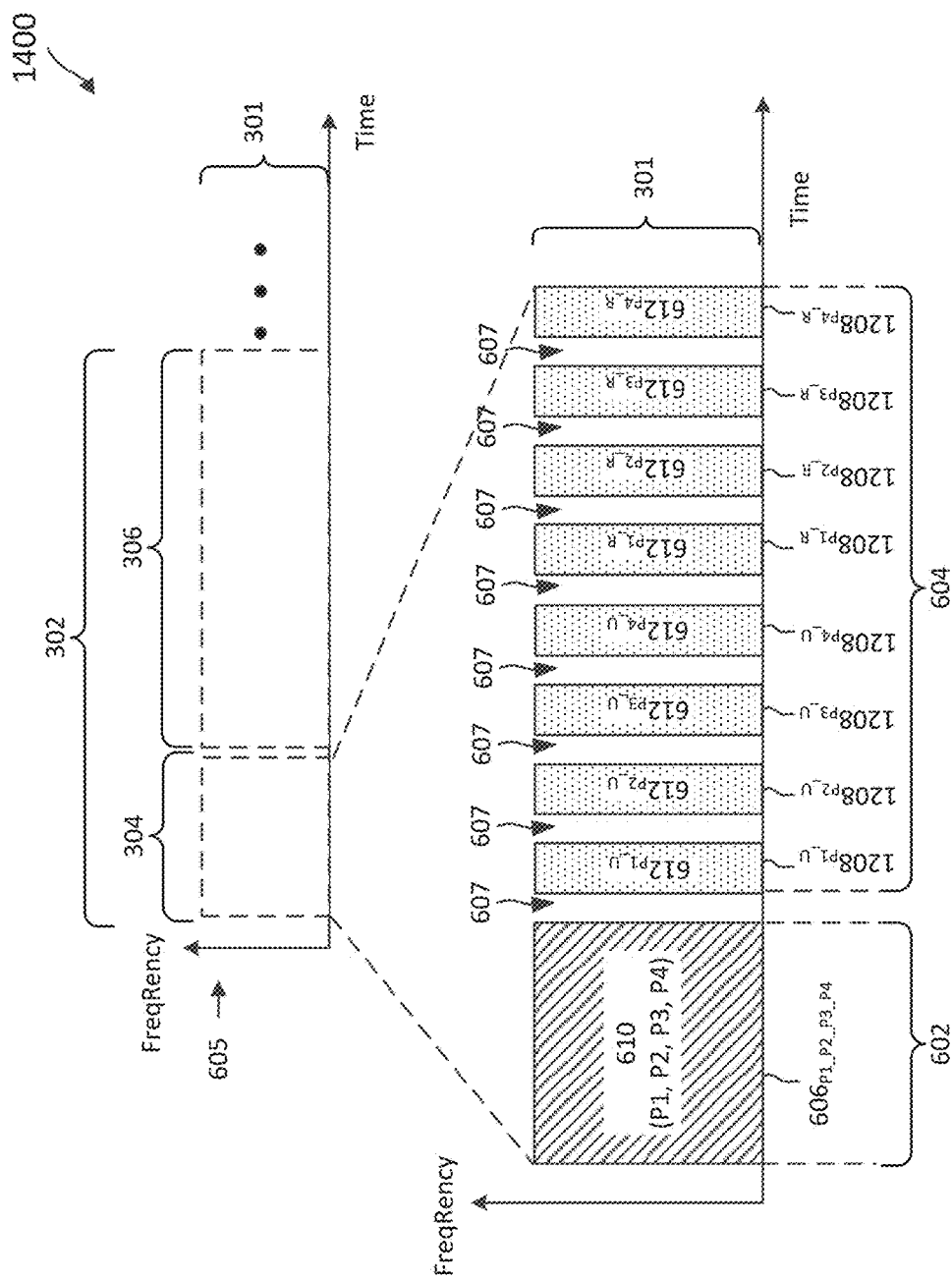
FIG. 14 illustrates a priority-based spectrum access scheme with TDM contentions according to embodiments of the present disclosure.

FIGS. 12-14 illustrate various dynamic medium or spectrum access mechanisms with TDM contentions and may be employed by the BSs 105, 205, and 500 and the UEs 115, 215, and 400. The use of the TDM contentions may avoid the issue of unnecessarily yielding of access as shown in the scenarios 1000 and 1100. While FIGS. 12-14 are illustrated with two network operating entities (e.g., Operator A and Operator B) for purposes of simplicity of discussion, it will be recognized that embodiments of the present disclosure may scale to many more UEs 115, 215, and 400 and/or BSs 105, 205, and 500. In FIGS. 12-14, the x-axes represent time in some constant units, and the y-axes represent frequency in some constant units.

FIG. 12 illustrates a priority-based spectrum access scheme 1200 with TDM contentions according to embodiments of the present disclosure. The scheme 1200 is similar to the scheme 800, but the contentions period 604 includes a plurality of contention sub-periods 1208 instead of the FDM contention slots 608. The contention sub-periods 1208 may be separated by switching periods 607. Each contention sub-period 1208 may be assigned to a particular access priority. The contention sub-periods 1208 may be positioned in a decreasing priority order. For example, the contention sub-periods $1208_{P1}$, $1208_{P2}$, $1208_{P3}$, and $1208_{P4}$ may be assigned to access priorities P1, P2, P3, and P4, respectively. The TDM arrangement of the contention sub-periods 1208 allows an intended receiving node to listen for higher priority reservations and only transmit a RRS signal 612 when there is no higher priority reservation detected. Thus, the scheme 1200 may avoid unnecessary yielding of access as shown in the scenarios 1000 and 1100.

FIG. 13 illustrates a priority-based spectrum access scheme 1300 with dynamic TDD according to embodiments of the present disclosure. The scheme 1300 is based on the scheme 1200 and provides a more detailed view of interactions among different operator nodes BSs A1, A2, B1, and B2 and UEs A1, A2, B1, and B2. The BSs A1, A2, B1, and B2 are similar to the BSs 105, 205, and 500. The UEs A1, A2, B1, and B2 are similar to the UEs 115, 215, and 400. For example, the BSs A1 and A2 and the UEs A1 and A2 are operator A nodes, and the BSs B1 and B2 and the UEs B1 and B2 are operator B nodes. The access priorities may be in the order of operator B DL (e.g., P1), operator B UL (e.g., P2), operator A DL (e.g., P3), and operator A UL (e.g., P4).

For example, the BS B1 transmits a RRQ signal $610_{P1}$ in the pre-scheduling period 602 to reserve the transmission period 306 for DL communication with the UE B2. For example, the RRQ signal $610_{P1}$ may include a DL grant for the UE B1 in the transmission period 306. The BS B2 transmits a RRQ signal $610_{P2}$ in the pre-scheduling period 602 to reserve the transmission period 306 for UL communication with the UE B2. For example, the RRQ signal $610_{P2}$ may include a UL grant for the UE B2 in the transmission period 306.

Similarly, the BS A1 transmits a RRQ signal $610_{P3}$ in the pre-scheduling period 602 to reserve the transmission period 306 for DL communication with the UE A2. For example, the RRQ signal $610_{P3}$ may include a DL grant for the UE AB1 in the transmission period 306. The BS A2 transmits a RRQ signal $610_{P4}$ in the pre-scheduling period 602 to reserve the transmission period 306 for UL communication with the UE A2. For example, the RRQ signal $610_{P4}$ may include a UL grant for the UE A2 in the transmission period 306. The RRQ signals $610_{P1}$, $610_{P2}$, $610_{P3}$, and $610_{P4}$ may be transmitted using corresponding assigned orthogonal resources in the pre-scheduling period 602. The orthogonal resources can be FDM, TDM, or CDM in the pre-scheduling period 602. In some other embodiments, when employing TDM, the TXOP 302 may include two separate periods for pre-scheduling, for example, a first period for P1 and P2 and a second period for P3 and P4 and the second period can be after the contention sub-periods $1208_{P1}$ and $1208_{P2}$.

Upon receiving, the RRQ signal $610_{P1}$, the UE B1 may respond with a RRS signal $612_{P1}$ in the contention sub-period $1208_{P1}$ since the UE B1 has the highest access priority P1. Subsequently, the BS B1 and the UE B1 may proceed with the DL communication 1310 in the transmission period 306. The UE B1 may transmit a UL control 1312 at the end of the transmission period 306.

The BS B2 and the UE B2 may monitor the higher priority contention sub-period $1208_{P1}$. Upon detecting the RRS signal $612_{P1}$, the BS B2 may not transmit a RRS signal and the UE B2 may refrain from the UL communication. However, when no RRS signal is detected in the higher priority contention sub-period $1208_{P1}$, the BS B2 may transmit a RRS signal $612_{P2}$ in the contention sub-period $1208_{P2}$ and the UE B2 may proceed with UL communications 1320 and 1322 in the transmission period 306, which dynamically switches the access priority from a DL direction to a UL direction.

The BS A1 and the UE A1 may monitor the higher priority contention sub-periods $1208_{P1}$ and $1208_{P2}$. Upon detecting the RRS signal $612_{P1}$ or $612_{P2}$, the UE A1 may not transmit a RRS signal and the BS A1 may refrain from the DL communication. However, when no RRS signal is detected in the higher priority contention sub-periods $1208_{P1}$ and $1208_{P2}$, the UE A1 may transmit a RRS signal $612_{P3}$ contention sub-period $1208_{P3}$ and the BS A1 may proceed with DL communication 1330 and the UE A1 may transmit a UL control signal 1332 in the transmission period 306.

The BS A2 and the UE A2 may monitor the higher priority contention sub-periods $1208_{P1}$, $1208_{P2}$, and $1208_{P3}$. Upon detecting the RRS signal $612_{P1}$, $612_{P2}$, or $612_{P3}$, the BS A2 may not transmit a RRS signal and the UE A2 may refrain from the UL communication. However, when no RRS signal is detected in the higher priority contention sub-periods $1208_{P1}$, $1208_{P2}$, and $1208_{P3}$, the BS A2 may transmit a RRS signal $612_{P4}$ and the UE A2 may proceed with UL communications 1340 and 1342, which dynamically switches the access priority from a DL direction to a UL direction. It should be noted that the RRS signal $612_{P4}$ is transmitted in the contention sub-period $1208_{P3}$. The RRS signal $612_{P4}$ of the last priority node (e.g., the BS A2) is not required and can be omitted. Thus, by combining the contention sub-periods of the last two access priorities can further reduce bandwidth utilization.

FIG. 14 illustrates a priority-based spectrum access scheme 1400 with TDM contentions according to embodiments of the present disclosure. The scheme 1400 is similar to the scheme 1200, but the contentions period 604 includes additional contention sub-periods 1208 to support reservations for URLLC traffic and regular traffic. Each contention sub-period 1208 may be assigned to a particular access priority and a particular traffic priority. The contention sub-periods 1208 may be positioned in a decreasing priority order. For example, the contention sub-periods $1208_{P1\_U}$, $1208_{P2\_U}$, $1208_{P3\_U}$, and $1208_{P4\_U}$ may be assigned to access priorities P1, P2, P3, and P4, respectively, for URLLC reservations. The contention sub-periods $1208_{P1\_R}$, $1208_{P2\_R}$, $1208_{P3\_R}$, and $1208_{P4\_R}$ may be assigned to access priorities P1, P2, P3, and P4, respectively, for regular reservations. In operation, the BS 205a and 205b and the UEs 215a and 215b may employ similar mechanisms as the scheme 1300 for spectrum sharing. However, the RRQ signals 610 and the RRS signals 620 may further indicate a traffic priority (e.g., a URLLC traffic priority or a regular traffic priority). For example, the BS 205b may transmit a RRQ signal $610_{P1\_U}$ in the pre-scheduling period 602 (e.g., using an assigned orthogonal resource) to reserve the following transmission period 306 fo DL URLLC communication with the UE 215b. In response, the UE 215b may transmit a RRS signal $612_{P1\_U}$ in the contention sub-period $1208_{P1\_U}$.

Figure 15:
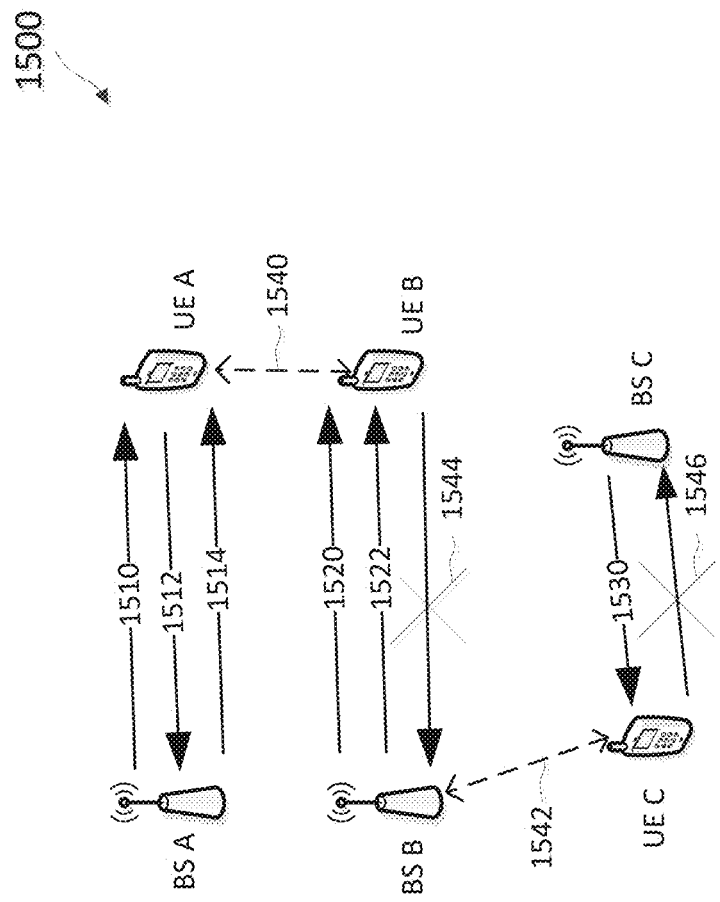
FIG. 15 illustrates a hidden node or exposed node scenario according to embodiments of the present disclosure.

The schemes 1200, 1300, and 1400 may perform well and may avoid the unnecessary yielding issues described with respect to the scenarios 1000 and 1100. However, the schemes 1200, 1300, and 1400 may not address the issues of hidden nodes, where two nodes cannot hear each other. FIG. 15 illustrates a hidden node or exposed node scenario 1500 according to embodiments of the present disclosure. In the scenario 1500, the higher operator has a default link priority of DL, where DL communication has a higher access priority than UL communication. As an example, in a pre-scheduling period 602, the BS A transmits a first RRQ signal (e.g., the RRQ signal 610) for DL communication with the UE A as shown by the arrow 1510, the BS B transmits a second RRQ signal for UL communication with the UE B as shown by the arrow 1520, and the BS C transmits a third RRQ signal for UL communication with the UE C as shown by the arrow 1530.

The UE A (e.g., the target receiver) responds to the first RRQ signal with a first RRS signal (e.g., the RRS signal 612), for example, in an assigned contention sub-period 1208 as shown by the arrow 1512. Since BS A has the highest access priority, the BS A may proceed with the intended DL communication with the UE A as shown by the arrow 1514.

The BS B (e.g., the target receiver) cannot detect the first RRS signal and responds to the second RRQ signal with a second RRS signal in an assigned contention sub-period 1208 as shown by the arrow 1522. However, the UE B detected the first RRQ signal, and thus may refrain from the UL communication as shown by the cross 1544.

The UE C may detect the second RRS signal transmitted by the BS B as shown by the arrow 1542 and refrain from UL communication with the BS C as shown by the cross 1546. However, the UE B did not proceed with the UL communication and the UE C can potentially transmit without causing significant interference to the DL transmission of the BS A. Thus, the transmission of the second RRS signal by the BS B due to the missed detection (e.g., the hidden node issue) of the first RRS signal causes the UE C to unnecessarily yield access (e.g., the exposed node issue).

Figure 16:
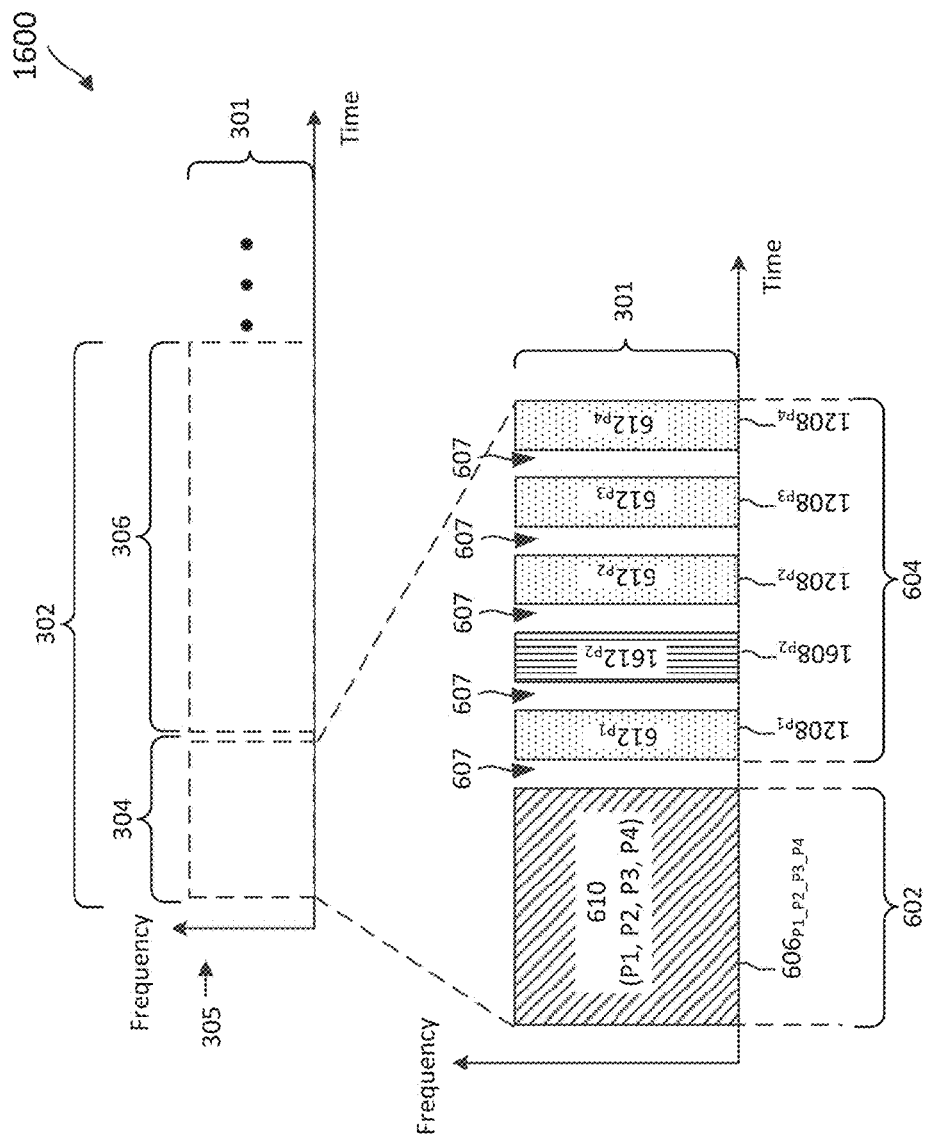
FIG. 16 illustrates a priority-based spectrum access scheme with TDM contentions and confirmation reservations according to embodiments of the present disclosure.

FIG. 16 illustrates a priority-based spectrum access scheme 1600 with TDM contentions and confirmation reservations according to embodiments of the present disclosure. The scheme 1600 may be employed by the BSs 105, 205, and 500 and the UEs 115, 215, and 400. In FIG. 16, the x-axis represents time in some constant units, and the y-axis represents frequency in some constant units. The scheme 1600 is similar to the scheme 1200, but the contention period 604 includes one or more additional reservation confirmation periods 1608 to allow for transmissions of reservation confirmations from target transmitting nodes. For example, an additional reservation confirmation period 1608 is included for the last access priority of each operator. As shown, the reservation confirmation period $1608_{P2}$ is added before the contention sub-period $1208_{P2}$ for the access priority P2. Thus, to support N operators, the contention period 604 may include N–1 reservation confirmation periods 1608.

In the scheme 1600, instead of relying on an intended or target receiving node to transmit a RRS signal to confirm a reservation, an intended or target transmitting node may transmit a reservation confirmation signal 1612 in a corresponding reservation confirmation period 1608 and the intended receiving node may listen for the reservation confirmation signal 1612. When the intended receiving node does not detect a reservation confirmation signal 1612 after receiving a pre-schedule from a RRQ signal 610, the intended receiving node may refrain from transmitting a RRS signal 612. When the intended receiving node receives a reservation confirmation signal 1612 after receiving a pre-schedule from a RRQ signal 610, the intended receiving node may transmit a RRS signal 612. Thus, the use of reservation confirmations can avoid the hidden node or exposed node issue described in the scenario 1500. It should be noted that lowest access priority does not need to transmit a reservation confirmation, and thus no reservation confirmation period 1608 is included for the last access priority P4.

Figure 17:
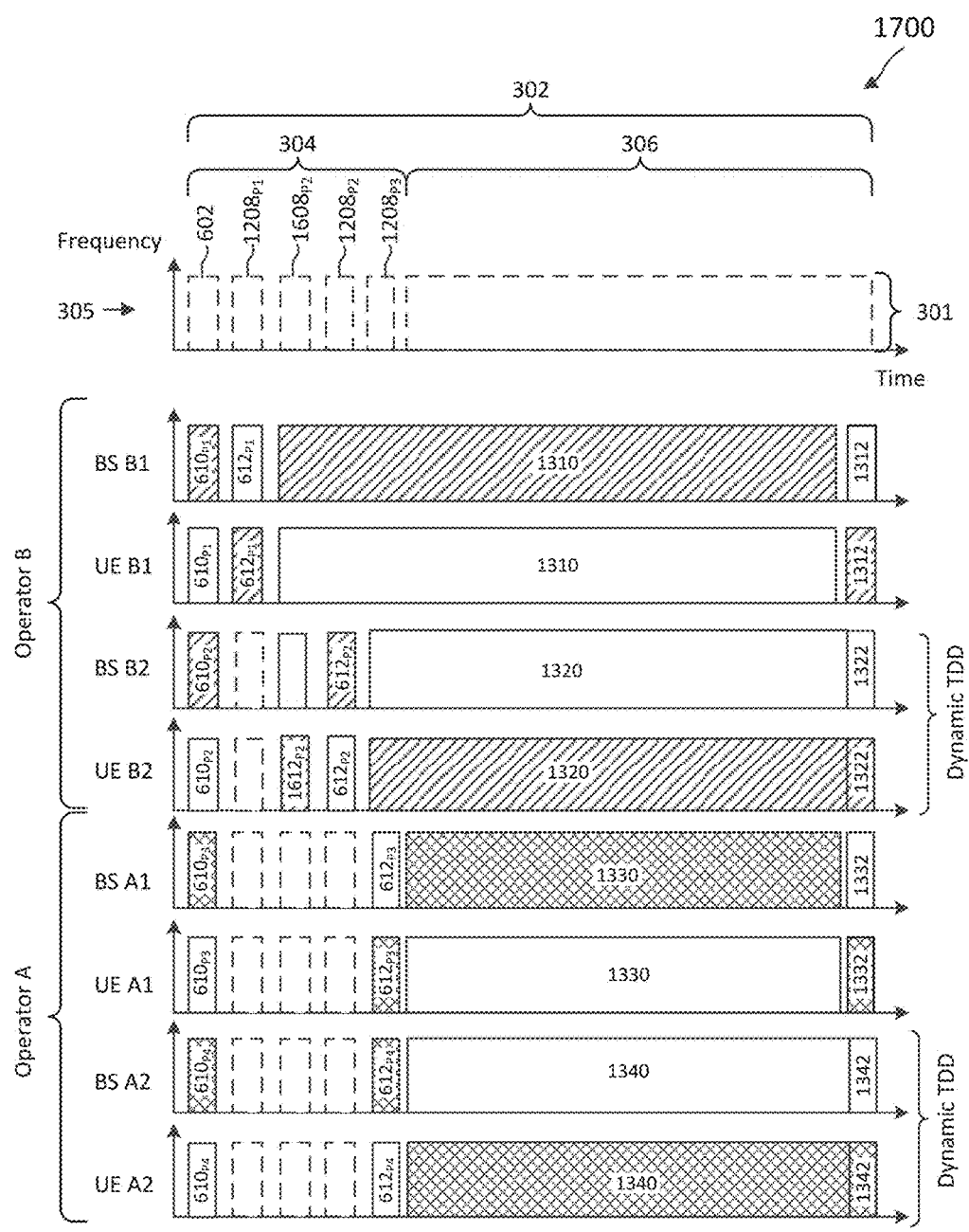
FIG. 17 illustrates a priority-based spectrum access scheme with TDM contentions and reservation confirmations according to embodiments of the present disclosure.

FIG. 17 illustrates a priority-based spectrum access scheme 1700 with TDM contentions and reservation confirmations according to embodiments of the present disclosure. The scheme 1700 is based on the scheme 1600 and provides a more detailed view of interactions among different operator nodes BSs A1, A2, B1, and B2 and UEs A1, A2, B1, and B2. The BSs A1, A2, B1, and B2 are similar to the BSs 105, 205, and 500. The UEs A1, A2, B1, and B2 are similar to the UEs 115, 215, and 400. For example, the BSs A1 and A2 and the UEs A1 and A2 are operator A nodes, and the BSs B1 and B2 and the UEs B1 and B2 are operator B nodes. The access priorities may be in the order of operator B DL (e.g., P1), operator B UL (e.g., P2), operator A DL (e.g., P3), and operator A UL (e.g., P4).

The exchanges of the reservation request signals 610 and the reservation response signals 612 for the access priorities P1 (e.g., the BS B1 and the UE B1), P3 (e.g., the BS A1 and the UE A1), and P4 (e.g., the BS A2 and the UE A2) are similar to the scheme 1300.

For the access priority P2, the BS B2 transmits a RRQ signal $610_{P2}$ in the pre-scheduling period 602 to reserve the transmission period 306 for UL communication with the UE B2 similar to the scheme 1300. For example, the RRQ signal $610_{P2}$ may include a UL grant for the UE B2 in the transmission period 306. Upon receiving the RRQ signal $610_{P2}$, the BS B2 and the UE B2 may listen to the high priority contention sub-period $1208_{P1}$. Upon detecting the RRS signal $612_{P1}$, the UE B2 (e.g., the intended transmitting node) may not transmit a reservation confirmation signal and may refrain from the UL communication. The BS B2 (e.g., the intended receiver) may monitor for a reservation confirmation signal in the reservation confirmation period $1608_{72}$. When no reservation confirmation signal is detected, the BS B2 may not transmit a RRS signal. Thus, the BS B2 may not send a RRS signal.

However, when no RRS signal is detected in the higher priority contention sub-period $1208_{P1}$, the BS B2 may transmit a reservation confirmation signal $1612_{P2}$ in the reservation confirmation period $1604_2$. Upon receiving the reservation confirmation signal $1612_{P2}$, the BS B2 may transmit a RRS signal $612_{P2}$ in the contention sub-period $1208_{P2}$. Subsequently, the UE B2 may proceed with UL communication 1320 and 1322 in the transmission period 306, which dynamically switches the access priority from a DL direction to a UL direction.

Figure 18:
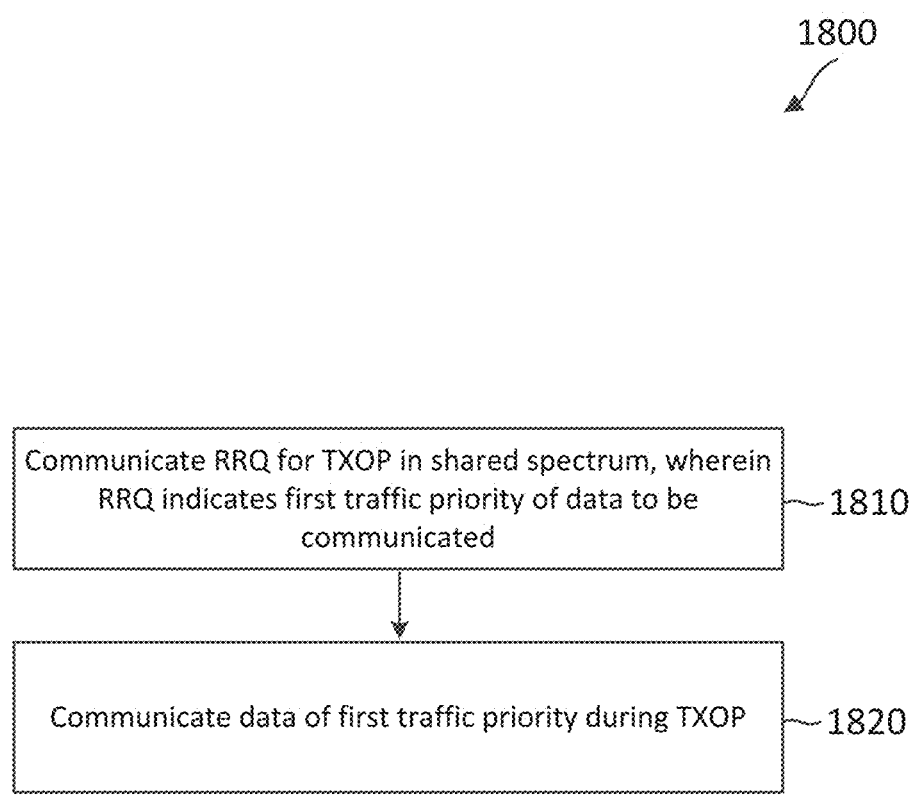
FIG. 18 is a flow diagram of a method of performing dynamic spectrum access according to embodiments of the present disclosure.

FIG. 18 is a flow diagram of a method 1800 of performing dynamic spectrum access according to embodiments of the present disclosure. Steps of the method 1800 can be executed by a computing device (e.g., a processor, processing circuit, and/or other suitable component) of a wireless communication device, such as the BSs 105, 205, and 500 and the UEs 115, 215, and 400. The method 1800 may employ similar mechanisms as in the scheme 600, the method 700, and the scheme 800 as described with respect to FIGS. 6, 7, and 8, respectively. As illustrated, the method 1800 includes a number of enumerated steps, but embodiments of the method 1800 may include additional steps before, after, and in between the enumerated steps. In some embodiments, one or more of the enumerated steps may be omitted or performed in a different order.

At step 1810, the method 1800 includes communicating a RRQ (e.g., the RRQ signals 610) for a TXOP (e.g., the TXOP 302) in a shared spectrum (e.g., in the frequency band 301). The spectrum is shared by a plurality of network operating entities (e.g., Operators A and B). For example, the wireless communication device (e.g., the BS 205a or the UE 215a) is associated with a first network operating entity (e.g., Operator A) of the plurality of network operating entities and communicates the RRQ with a second wireless communication device (e.g., the UE 215a or the BS 205a) of the same first network operating entity. The RRQ can be communicated in a pre-scheduling period similar to the pre-scheduling period 602. The RRQ indicates a first traffic priority (e.g., the URLLC or regular priority) of data to be communicated.

At step 1820, the method 1800 includes communicating the data of the first traffic priority with the second wireless communication device during the TXOP (e.g. in a transmission period 306).

Figure 19:
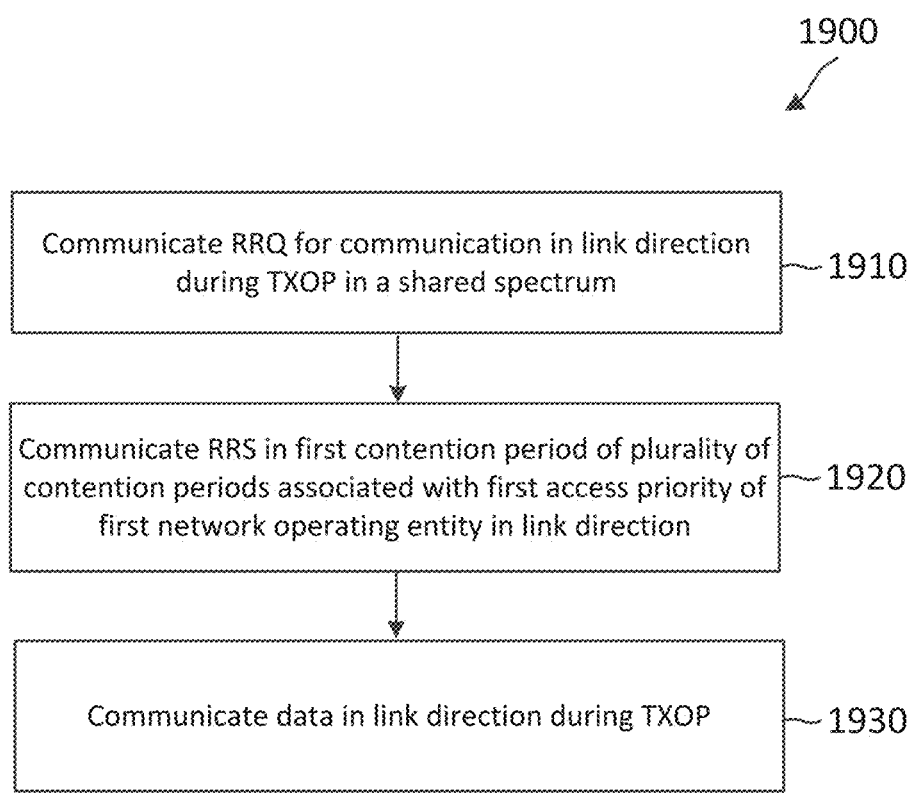
FIG. 19 is a flow diagram of a method of performing dynamic spectrum access according to embodiments of the present disclosure.

FIG. 19 is a flow diagram of a method 1900 of performing dynamic spectrum access according to embodiments of the present disclosure. Steps of the method 1900 can be executed by a computing device (e.g., a processor, processing circuit, and/or other suitable component) of a wireless communication device, such as the BSs 105, 205, and 500 and the UEs 115, 215, and 400. The method 1900 may employ similar mechanisms as in the scheme 1200, 1300, 1400, 1600, and 1700 described with respect to FIGS. 12, 13, 14, 16, and 17. As illustrated, the method 1900 includes a number of enumerated steps, but embodiments of the method 1900 may include additional steps before, after, and in between the enumerated steps. In some embodiments, one or more of the enumerated steps may be omitted or performed in a different order.

At step 1910, the method 1900 includes communicating a RRQ (e.g., the RRQ signals 610) for communication in a link direction (e.g., UL or DL) during a TXOP (e.g., the TXOP 302) in a shared spectrum (e.g., in the frequency band 301). The spectrum is shared by a plurality of network operating entities (e.g., Operators A and B). For example, the wireless communication device (e.g., the BS 205a or the UE 215a) is associated with a first network operating entity (e.g., Operator A) of the plurality of network operating entities and communicates the RRQ with a second wireless communication device (e.g., the UE 215a or the BS 205a) of the same first network operating entity. The RRQ can be communicated in a pre-scheduling period similar to the pre-scheduling period 602.

At step 1920, the method 1900 includes communicating a RRS (e.g., the RRS signals 612) with the second wireless communication device in a first contention period of a plurality of contention periods (e.g., the contention sub-periods 1208) associated with a first access priority (e.g., P1, P2, P3, or P4) of the first network operating entity in the link direction. The RRS is communicated with the second wireless communication device.

At step 1930, the method 1900 includes communicating the data with the second wireless communication device in the link direction during the TXOP (e.g. in a transmission period 306).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising communicating, by a first wireless communication device with a second wireless communication device, a reservation request (RRQ) for a transmission opportunity (TXOP) in a shared spectrum, wherein the shared spectrum is shared by a plurality of network operating entities, wherein the first wireless communication device and the second wireless communication device are associated with a first network operating entity of the plurality of network operating entities, and wherein the RRQ indicates a first traffic priority of data to be communicated; and communicating, by the first wireless communication device with the second wireless communication device, the data of the first traffic priority during the TXOP.

In some embodiments, the TXOP includes a reservation period and a transmission period, wherein the RRQ is communicated in the reservation period, and wherein the data is communicated in the transmission period. In some embodiments, the reservation period includes a pre-scheduling period and a contention period, wherein the pre-scheduling period includes first resources, each of the first resources associated with one of the plurality of network operating entities, and wherein the contention period includes second resources, each of the second resources associated with one of a plurality of access priorities. In some embodiments, the plurality of access priorities includes an uplink (UL) access priority and a downlink (DL) access priority for each of the plurality of network operating entities. In some embodiments, the communicating the RRQ for the TXOP includes transmitting, by the first wireless communication device, the RRQ using one of the first resources associated with the first network operating entity. In some embodiments, the communicating the RRQ for the TXOP includes receiving, by the first wireless communication device, the RRQ via one of the first resources associated with the first network operating entity. In some embodiments, the method further comprises transmitting, by the first wireless communication device in response to the RRQ, a reservation response (RRS) using one of the second resources, wherein the RRS includes the first traffic priority indicated by the RRQ, and wherein the communicating the data of the first traffic priority includes receiving, by the first wireless communication device, the data. In some embodiments, the method further comprises receiving, by the first wireless communication device from the second wireless communication device, a reservation response (RRS) via one of the second resources, wherein the RRS includes the first traffic priority indicated by the RRQ, and wherein the communicating the data of the first traffic priority includes transmitting, by the first wireless communication device to the second wireless communication device, the data. In some embodiments, the method further comprises detecting, by the first wireless communication device in another one of the second resources, a reservation response (RRS) associated with another RRQ for the TXOP, wherein the RRS indicates a second traffic priority; and determining, by the first wireless communication device, whether the first traffic priority is higher than the second traffic priority, wherein the communicating the data of the first traffic priority includes transmitting, by the first wireless communication device, the data based on the determining that the first traffic priority is higher than the second traffic priority. In some embodiments, the first network operating entity has a first access priority of the plurality of access priorities in the TXOP, wherein the another one of the second resources is associated with a second access priority of the plurality of access priorities, and wherein the method further comprises determining, by the first wireless communication device, that the first access priority is lower than the second access priority; and determining, by the first wireless communication device, to proceed with the communicating the data of the first traffic priority based on the determining that the first traffic priority is higher than the second traffic priority. In some embodiments, the first traffic priority is associated with ultra-reliability low latency communication (URLLC) traffic, and wherein the second traffic priority is associated with regular traffic. In some embodiments, the method further comprises communicating, by the first wireless communication device with a third wireless communication device associated with the first network operating entity, a first RRQ for another TXOP, wherein the first RRQ indicates a second traffic priority; detecting, by the first wireless communication device, a reservation response (RRS) associated with a second RRQ for the another TXOP, wherein the RRS indicates a third traffic priority; determining, by the first wireless communication device, whether the third traffic priority is higher than the second traffic priority; and refraining, by the first wireless communication device, from communicating with the third wireless communication device in the another TXOP based on the determining the third traffic priority is higher than the second traffic priority.

Further embodiments of the present disclosure include a method of wireless communication, comprising communicating, by a first wireless communication device with a second wireless communication device, a reservation request (RRQ) for communication in a link direction during a transmission opportunity (TXOP) in a shared spectrum, wherein the shared spectrum is shared by a plurality of network operating entities, and wherein the first wireless communication device and the second wireless communication device are associated with a first network operating entity of the plurality of network operating entities; communicating, by the first wireless communication device with the second wireless communication device, a reservation response (RRS) in a first contention period of a plurality of contention periods associated with a first access priority of the first network operating entity in the link direction; and communicating, by the first wireless communication device with the second wireless communication device, data in the link direction during the TXOP.

In some embodiments, the TXOP includes a pre-scheduling period, the plurality of contention periods, and a transmission period, and wherein the data is communicated in the transmission period. In some embodiments, the pre-scheduling period includes resources, each of the resources associated with one of the plurality of network operating entities, and wherein the RRQ is communicated using one of the resources associated with the first network operating entity. In some embodiments, the method further comprises monitoring, by the first wireless communication device in a second contention period of the plurality of contention periods, for another RRS for the TXOP, wherein the second contention period is associated with a higher access priority than the first access priority; and determining, by the first wireless communication device, that there is no transmission of RRS in the second contention period based on the monitoring. In some embodiments, the communicating the RRS includes transmitting, by the first wireless communication device, the RRS based on the determining, and wherein the communicating the data in the link direction during the TXOP includes receiving, by the first wireless communication device, the data in the link direction during the TXOP. In some embodiments, the method further comprises transmitting, by the first wireless communication device, a reservation confirmation based on the determining, wherein the TXOP further includes a confirmation period before the first contention period, wherein the reservation confirmation is transmitted during the confirmation period, and wherein the communicating the data in the link direction during the TXOP includes transmitting, by the first wireless communication device, the data in the link direction during the TXOP. In some embodiments, the RRS is communicated based on the reservation confirmation. In some embodiments, the first contention period is further associated with a first traffic priority, wherein the method further comprises detecting, by the first wireless communication device, another RRS for the TXOP in a second contention period of the plurality of contention periods, wherein the second contention period is associated with a higher access priority than the first access priority, and wherein the another RRS indicates a second traffic priority; and determining, by the first wireless communication device, whether the first traffic priority is higher than the second traffic priority, and wherein the data is communicated in the link direction during the TXOP based on the determining the first traffic priority is higher than the second traffic priority. In some embodiments, the method further comprises communicating, by the first wireless communication device with a third wireless communication device associated with the first network operating entity, a first RRQ for another TXOP, wherein the first RRQ indicates a second traffic priority; detecting, by the first wireless communication device, a RRS associated with a second RRQ for the another TXOP, wherein the second RRQ indicates a third traffic priority; determining, by the first wireless communication device, whether the third traffic priority is higher than the second traffic priority; and refraining, by the first wireless communication device, from communicating with the third wireless communication device in the another TXOP based on the determining the third traffic priority is higher than the second traffic priority. In some embodiments, the method further comprises monitoring, by the first wireless communication device in a second contention period of the plurality of contention periods, for another RRS for the TXOP, wherein the second contention period is associated with a second access priority higher than the first access priority, and wherein the second access priority is for the first network operating entity in another link direction; and determining, by the first wireless communication device, that there is no RRS in the second contention period based on the monitoring, wherein the data is communicated in the link direction based on the determining.

Further embodiments of the present disclosure include an apparatus comprising a transceiver configured to communicate with a first wireless communication device, a reservation request (RRQ) for a transmission opportunity (TXOP) in a shared spectrum, wherein the shared spectrum is shared by a plurality of network operating entities, wherein the apparatus and the first wireless communication device are associated with a first network operating entity of the plurality of network operating entities, and wherein the RRQ indicates a first traffic priority of data to be communicated; and communicate with the first wireless communication device, the data of the first traffic priority during the TXOP.

In some embodiments, the TXOP includes a reservation period and a transmission period, wherein the RRQ is communicated in the reservation period, and wherein the data is communicated in the transmission period. In some embodiments, the reservation period includes a pre-scheduling period and a contention period, wherein the pre-scheduling period includes first resources, each of the first resources associated with one of the plurality of network operating entities, and wherein the contention period includes second resources, each of the second resources associated with one of a plurality of access priorities. In some embodiments, the plurality of access priorities includes an uplink (UL) access priority and a downlink (DL) access priority for each of the plurality of network operating entities. In some embodiments, the transceiver is further configured to communicate the RRQ for the TXOP by transmitting the RRQ using one of the first resources associated with the first network operating entity. In some embodiments, the transceiver is further configured to communicate the RRQ for the TXOP by receiving the RRQ via one of the first resources associated with the first network operating entity. In some embodiments, the transceiver is further configured to transmit, in response to the RRQ, a reservation response (RRS) using one of the second resources, wherein the RRS includes the first traffic priority indicated by the RRQ; and communicate the data of the first traffic priority by receiving the data. In some embodiments, the transceiver is further configured to receive, from the first wireless communication device, a reservation response (RRS) via one of the second resources, wherein the RRS includes the first traffic priority indicated by the RRQ; and communicate the data of the first traffic priority by transmitting, to the first wireless communication device, the data. In some embodiments, the apparatus further comprises a processor configured to detect, in another one of the second resources, a reservation response (RRS) associated with another RRQ for the TXOP, wherein the RRS indicates a second traffic priority; and determine whether the first traffic priority is higher than the second traffic priority, wherein the transceiver is further configured to communicate the data of the first traffic priority by transmitting the data when the first traffic priority is determined to be higher than the second traffic priority. In some embodiments, the first network operating entity has a first access priority of the plurality of access priorities in the TXOP, wherein the another one of the second resources is associated with a second access priority of the plurality of access priorities, and wherein the processor is further configured to determine that the first access priority is lower than the second access priority; and determine to proceed with communicating the data of the first traffic priority when first traffic priority is determined to be higher than the second traffic priority. In some embodiments, the first traffic priority is associated with ultra-reliability low latency communication (URLLC) traffic, and wherein the second traffic priority is associated with regular traffic. In some embodiments, the transceiver is further configured to communicate with a second wireless communication device associated with the first network operating entity, a first RRQ for another TXOP, wherein the first RRQ indicates a second traffic priority, and wherein the apparatus further comprises a processor configured to detect a reservation response (RRS) associated with a second RRQ for the another TXOP, and wherein the RRS indicates a third traffic priority; determine whether the third traffic priority is higher than the second traffic priority; and refrain from communicating with the second wireless communication device in the another TXOP when the third traffic priority is determined to be higher than the second traffic priority.

Further embodiments of the present disclosure include an apparatus comprising a transceiver configured to communicate, with a first wireless communication device, a reservation request (RRQ) for communication in a link direction during a transmission opportunity (TXOP) in a shared spectrum, wherein the shared spectrum is shared by a plurality of network operating entities, and wherein the apparatus and the first wireless communication device are associated with a first network operating entity of the plurality of network operating entities; communicate, with the first wireless communication device, a reservation response (RRS) in a first contention period of a plurality of contention periods associated with a first access priority of the first network operating entity in the link direction; and communicate, with the first wireless communication device, data in the link direction during the TXOP.

In some embodiments, the TXOP includes a pre-scheduling period, the plurality of contention periods, and a transmission period, and wherein the data is communicated in the transmission period. In some embodiments, the pre-scheduling period includes resources, each of the resources associated with one of the plurality of network operating entities, and wherein the RRQ is communicated using one of the resources associated with the first network operating entity. In some embodiments, the apparatus further comprises a processor configured to monitor, in a second contention period of the plurality of contention periods, for another RRS for the TXOP, wherein the second contention period is associated with a higher access priority than the first access priority; and determine that there is no transmission of RRS in the second contention period based on the monitoring. In some embodiments, the transceiver is further configured to communicate the RRS by transmitting the RRS when there is no transmission of RRS in the second contention period, and communicate the data in the link direction during the TXOP by receiving the data in the link direction during the TXOP. In some embodiments, the transceiver is further configured to transmit a reservation confirmation there is no transmission of RRS in the second contention period, wherein the TXOP further includes a confirmation period before the first contention period, and wherein the reservation confirmation is transmitted during the confirmation period; and communicate the data in the link direction during the TXOP by transmitting the data in the link direction during the TXOP. In some embodiments, the RRS is communicated based on the reservation confirmation. In some embodiments, the first contention period is further associated with a first traffic priority, wherein the apparatus further comprises a processor configured to detect another RRS for the TXOP in a second contention period of the plurality of contention periods, wherein the second contention period is associated with a higher access priority than the first access priority, and wherein the another RRS indicates a second traffic priority; and determine whether the first traffic priority is higher than the second traffic priority, and wherein the data is communicated in the link direction during the TXOP when the first traffic priority is determined to be higher than the second traffic priority. In some embodiments, the transceiver is further configured to communicate, with a second wireless communication device associated with the first network operating entity, a first RRQ for another TXOP, wherein the first RRQ indicates a second traffic priority, and wherein the apparatus further comprises a processor configured to detect a RRS associated with a second RRQ for the another TXOP, wherein the second RRQ indicates a third traffic priority; determine whether the third traffic priority is higher than the second traffic priority; and refrain from communicating with the second wireless communication device in the another TXOP when the third traffic priority is determined to be higher than the second traffic priority. In some embodiments, the apparatus further comprises a processor configured to monitor, in a second contention period of the plurality of contention periods, for another RRS for the TXOP, wherein the second contention period is associated with a second access priority higher than the first access priority, and wherein the second access priority is for the first network operating entity in another link direction; and determine that there is no RRS in the second contention period based on the monitoring, wherein the data is communicated in the link direction when there is no transmission of RRS in the second contention period.

Further embodiments of the present disclosure include a computer-readable medium having program code recorded thereon, the program code comprising code for causing a first wireless communication device to communicate, with a second wireless communication device, a reservation request (RRQ) for a transmission opportunity (TXOP) in a shared spectrum, wherein the shared spectrum is shared by a plurality of network operating entities, wherein the first wireless communication device and the second wireless communication device are associated with a first network operating entity of the plurality of network operating entities, and wherein the RRQ indicates a first traffic priority of data to be communicated; and code for causing the first wireless communication device to communicate, with the second wireless communication device, the data of the first traffic priority during the TXOP.

In some embodiments, the TXOP includes a reservation period and a transmission period, wherein the RRQ is communicated in the reservation period, and wherein the data is communicated in the transmission period. In some embodiments, the reservation period includes a pre-scheduling period and a contention period, wherein the pre-scheduling period includes first resources, each of the first resources associated with one of the plurality of network operating entities, and wherein the contention period includes second resources, each of the second resources associated with one of a plurality of access priorities. In some embodiments, the plurality of access priorities includes an uplink (UL) access priority and a downlink (DL) access priority for each of the plurality of network operating entities. In some embodiments, the code for communicating the RRQ for the TXOP is further configured to transmit the RRQ using one of the first resources associated with the first network operating entity. In some embodiments, the code for communicating the RRQ for the TXOP is further configured to receive the RRQ via one of the first resources associated with the first network operating entity. In some embodiments, the computer-readable medium further comprises code for causing the first wireless communication device to transmit, in response to the RRQ, a reservation response (RRS) using one of the second resources, wherein the RRS includes the first traffic priority indicated by the RRQ, and wherein the code for communicating the data of the first traffic priority is further configured to receive the data. In some embodiments, the computer-readable medium further comprises code for causing the first wireless communication device to receive, from the second wireless communication device, a reservation response (RRS) via one of the second resources, wherein the RRS includes the first traffic priority indicated by the RRQ, and wherein the code for communicating the data of the first traffic priority is further configured to transmit, to the second wireless communication device, the data. In some embodiments, the computer-readable medium further comprises code for causing the first wireless communication device to detect, in another one of the second resources, a reservation response (RRS) associated with another RRQ for the TXOP, wherein the RRS indicates a second traffic priority; and code for causing the first wireless communication device to determine whether the first traffic priority is higher than the second traffic priority, wherein the code for communicating the data of the first traffic priority is further configured to transmit the data when the first traffic priority is determined to be higher than the second traffic priority. In some embodiments, the first network operating entity has a first access priority of the plurality of access priorities in the TXOP, wherein the another one of the second resources is associated with a second access priority of the plurality of access priorities, and wherein the computer-readable medium further comprises code for causing the first wireless communication device to determine whether the first access priority is lower than the second access priority; and code for causing the first wireless communication device to determine to proceed with the communicating the data of the first traffic priority when the first traffic priority is determined to be higher than the second traffic priority. In some embodiments, the first traffic priority is associated with ultra-reliability low latency communication (URLLC) traffic, and wherein the second traffic priority is associated with regular traffic. In some embodiments, the computer-readable medium further comprises code for causing the first wireless communication device to communicate, with a third wireless communication device associated with the first network operating entity, a first RRQ for another TXOP, wherein the first RRQ indicates a second traffic priority; code for causing the first wireless communication device to detect a reservation response (RRS) associated with a second RRQ for the another TXOP, wherein the RRS indicates a third traffic priority; code for causing the first wireless communication device to determine whether the third traffic priority is higher than the second traffic priority; and code for causing the first wireless communication device to refrain from communicating with the third wireless communication device in the another TXOP when the third traffic priority is determined to be higher than the second traffic priority.

Further embodiments of the present disclosure include a computer-readable medium having program code recorded thereon, the program code comprising code for causing a first wireless communication device to communicate, with a second wireless communication device, a reservation request (RRQ) for communication in a link direction during a transmission opportunity (TXOP) in a shared spectrum, wherein the shared spectrum is shared by a plurality of network operating entities, and wherein the first wireless communication device and the second wireless communication device are associated with a first network operating entity of the plurality of network operating entities; code for causing the first wireless communication device to communicate, with the second wireless communication device, a reservation response (RRS) in a first contention period of a plurality of contention periods associated with a first access priority of the first network operating entity in the link direction; and code for causing the first wireless communication device to communicate, with the second wireless communication device, data in the link direction during the TXOP.

In some embodiments, the TXOP includes a pre-scheduling period, the plurality of contention periods, and a transmission period, and wherein the data is communicated in the transmission period. In some embodiments, the pre-scheduling period includes resources, each of the resources associated with one of the plurality of network operating entities, and wherein the RRQ is communicated using one of the resources associated with the first network operating entity. In some embodiments, the computer-readable medium further comprises code for causing the first wireless communication device to monitor, in a second contention period of the plurality of contention periods, for another RRS for the TXOP, wherein the second contention period is associated with a higher access priority than the first access priority; and code for causing the first wireless communication device to determine that there is no transmission of RRS in the second contention period based on the monitoring. In some embodiments, the code for communicating the RRS is further configured to transmit the RRS there is no transmission of RRS in the second contention period, and wherein the code for communicating the data in the link direction during the TXOP is further configured to receive the data in the link direction during the TXOP. In some embodiments, the computer-readable medium further comprises code for causing the first wireless communication device to transmit a reservation confirmation when there is no transmission of RRS in the second contention period, wherein the TXOP further includes a confirmation period before the first contention period, wherein the reservation confirmation is transmitted during the confirmation period, and wherein the code for communicating the data in the link direction during the TXOP is further configured to transmit the data in the link direction during the TXOP. In some embodiments, the RRS is communicated based on the reservation confirmation. In some embodiments, the first contention period is further associated with a first traffic priority, wherein the computer-readable medium further comprises code for causing the first wireless communication device to detecting, by the first wireless communication device, another RRS for the TXOP in a second contention period of the plurality of contention periods, wherein the second contention period is associated with a higher access priority than the first access priority, and wherein the another RRS indicates a second traffic priority; and code for causing the first wireless communication device to determine whether the first traffic priority is higher than the second traffic priority, and wherein the data is communicated in the link direction during the TXOP when the first traffic priority is determined to be higher than the second traffic priority. In some embodiments, the computer-readable medium further comprises code for causing the first wireless communication device to communicate, with a third wireless communication device associated with the first network operating entity, a first RRQ for another TXOP, wherein the first RRQ indicates a second traffic priority; code for causing the first wireless communication device to detect a RRS associated with a second RRQ for the another TXOP, wherein the second RRQ indicates a third traffic priority; code for causing the first wireless communication device to determine whether the third traffic priority is higher than the second traffic priority; and code for causing the first wireless communication device to refrain from communicating with the third wireless communication device in the another TXOP when the third traffic priority is determined to be higher than the second traffic priority. In some embodiments, the computer-readable medium further comprises code for causing the first wireless communication device to monitor, in a second contention period of the plurality of contention periods, for another RRS for the TXOP, wherein the second contention period is associated with a second access priority higher than the first access priority, and wherein the second access priority is for the first network operating entity in another link direction; and code for causing the first wireless communication device to determine that there is no RRS in the second contention period based on the monitoring, wherein the data is communicated in the link direction when there is no there is no RRS in the second contention period.

Further embodiments of the present disclosure include an apparatus comprising means for communicating, with a first wireless communication device, a reservation request (RRQ) for a transmission opportunity (TXOP) in a shared spectrum, wherein the shared spectrum is shared by a plurality of network operating entities, wherein the apparatus and the first wireless communication device are associated with a first network operating entity of the plurality of network operating entities, and wherein the RRQ indicates a first traffic priority of data to be communicated; and means for communicating with the first wireless communication device, the data of the first traffic priority during the TXOP.

In some embodiments, the TXOP includes a reservation period and a transmission period, wherein the RRQ is communicated in the reservation period, and wherein the data is communicated in the transmission period. In some embodiments, the reservation period includes a pre-scheduling period and a contention period, wherein the pre-scheduling period includes first resources, each of the first resources associated with one of the plurality of network operating entities, and wherein the contention period includes second resources, each of the second resources associated with one of a plurality of access priorities. In some embodiments, the plurality of access priorities includes an uplink (UL) access priority and a downlink (DL) access priority for each of the plurality of network operating entities. In some embodiments, the means for communicating the RRQ for the TXOP is further configured to transmitting the RRQ using one of the first resources associated with the first network operating entity. In some embodiments, the means for communicating the RRQ for the TXOP is further configured to receiving the RRQ via one of the first resources associated with the first network operating entity. In some embodiments, the apparatus further comprises means for transmitting, in response to the RRQ, a reservation response (RRS) using one of the second resources, wherein the RRS includes the first traffic priority indicated by the RRQ, and wherein the means for communicating the data of the first traffic priority is further configured to receive the data. In some embodiments, the apparatus further comprises means for receiving, from the first wireless communication device, a reservation response (RRS) via one of the second resources, wherein the RRS includes the first traffic priority indicated by the RRQ, and wherein the means for communicating the data of the first traffic priority is further configured to transmitting, to the first wireless communication device, the data. In some embodiments, the apparatus further comprises means for detecting, in another one of the second resources, a reservation response (RRS) associated with another RRQ for the TXOP, wherein the RRS indicates a second traffic priority; and means for determining whether the first traffic priority is higher than the second traffic priority, wherein the means for communicating the data of the first traffic priority is further configured to transmit the data when the first traffic priority is determined to be higher than the second traffic priority. In some embodiments, the first network operating entity has a first access priority of the plurality of access priorities in the TXOP, wherein the another one of the second resources is associated with a second access priority of the plurality of access priorities, and wherein the apparatus further comprises means for determining that the first access priority is lower than the second access priority; and means for determining to proceed with communicating the data of the first traffic priority when first traffic priority is determined to be higher than the second traffic priority. In some embodiments, the first traffic priority is associated with ultra-reliability low latency communication (URLLC) traffic, and wherein the second traffic priority is associated with regular traffic. In some embodiments, the apparatus further comprises means for communicating with a second wireless communication device associated with the first network operating entity, a first RRQ for another TXOP, wherein the first RRQ indicates a second traffic priority, and wherein the apparatus further comprises a processor configured to means for detecting a reservation response (RRS) associated with a second RRQ for the another TXOP, wherein the RRS indicates a third traffic priority; means for determining whether the third traffic priority is higher than the second traffic priority; and means for refraining from communicating with the second wireless communication device in the another TXOP when the third traffic priority is determined to be higher than the second traffic priority.

Further embodiments of the present disclosure include an apparatus comprising means for communicating, with a first wireless communication device, a reservation request (RRQ) for communication in a link direction during a transmission opportunity (TXOP) in a shared spectrum, wherein the shared spectrum is shared by a plurality of network operating entities, and wherein the apparatus and the first wireless communication device are associated with a first network operating entity of the plurality of network operating entities; means for communicating, with the first wireless communication device, a reservation response (RRS) in a first contention period of a plurality of contention periods associated with a first access priority of the first network operating entity in the link direction; and means for communicating, with the first wireless communication device, data in the link direction during the TXOP.

In some embodiments, the TXOP includes a pre-scheduling period, the plurality of contention periods, and a transmission period, and wherein the data is communicated in the transmission period. In some embodiments, the pre-scheduling period includes resources, each of the resources associated with one of the plurality of network operating entities, and wherein the RRQ is communicated using one of the resources associated with the first network operating entity. In some embodiments, the apparatus further comprises means for monitoring, in a second contention period of the plurality of contention periods, for another RRS for the TXOP, wherein the second contention period is associated with a higher access priority than the first access priority; and means for determining that there is no transmission of RRS in the second contention period based on the monitoring. In some embodiments, the means for communicating the RRS is further configured to transmit the RRS when there is no transmission of RRS in the second contention period, and wherein the means for communicating the data in the link direction during the TXOP is further configured to receive the data in the link direction during the TXOP. In some embodiments, the apparatus further comprises means for transmitting a reservation confirmation when there is no transmission of RRS in the second contention period, wherein the TXOP further includes a confirmation period before the first contention period, and wherein the reservation confirmation is transmitted during the confirmation period, and the means for communicating the data in the link direction during the TXOP is further configured to transmit the data in the link direction during the TXOP. In some embodiments, the RRS is communicated based on the reservation confirmation. In some embodiments, the first contention period is further associated with a first traffic priority, wherein the apparatus further comprises means for detecting another RRS for the TXOP in a second contention period of the plurality of contention periods, wherein the second contention period is associated with a higher access priority than the first access priority, and wherein the another RRS indicates a second traffic priority; and means for determining whether the first traffic priority is higher than the second traffic priority, and wherein the data is communicated in the link direction during the TXOP when the first traffic priority is determined to be higher than the second traffic priority. In some embodiments, the apparatus further comprises means for communicating, with a second wireless communication device associated with the first network operating entity, a first RRQ for another TXOP, wherein the first RRQ indicates a second traffic priority; means for detecting a RRS associated with a second RRQ for the another TXOP, wherein the second RRQ indicates a third traffic priority; means for determining whether the third traffic priority is higher than the second traffic priority; and means for refraining from communicating with the second wireless communication device in the another TXOP when the third traffic priority is determined to be higher than the second traffic priority. In some embodiments, the apparatus further comprises means for monitoring, in a second contention period of the plurality of contention periods, for another RRS for the TXOP, wherein the second contention period is associated with a second access priority higher than the first access priority, and wherein the second access priority is for the first network operating entity in another link direction; and means for determining that there is no RRS in the second contention period based on the monitoring, wherein the data is communicated in the link direction when there is no transmission of RRS in the second contention period.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
communicating, by a first wireless communication device with a second wireless communication device, a reservation request (RRQ) for a transmission opportunity (TXOP) in a shared spectrum, wherein the shared spectrum is shared by a plurality of network operating entities, wherein the first wireless communication device and the second wireless communication device are associated with a first network operating entity of the plurality of network operating entities, and wherein the RRQ indicates a first traffic priority of data to be communicated; and
communicating, by the first wireless communication device with the second wireless communication device, the data of the first traffic priority during the TXOP,
wherein the TXOP includes a pre-scheduling period and a contention period,
wherein the pre-scheduling period includes first resources, each of the first resources associated with one of the plurality of network operating entities,
wherein the contention period includes second resources, each of the second resources associated with one of a plurality of access priorities, and
wherein the RRQ is communicated using one of the first resources associated with the first network operating entity.

2. The method of claim 1, wherein the plurality of access priorities includes an uplink (UL) access priority and a downlink (DL) access priority for at least one of the plurality of network operating entities.

3. The method of claim 2, wherein the communicating the RRQ for the TXOP includes transmitting, by the first wireless communication device, the RRQ using one of the first resources associated with the first network operating entity, wherein the communicating the data of the first traffic priority includes transmitting, by the first wireless communication device to the second wireless communication device, the data, and wherein the method further comprises:
receiving, by the first wireless communication device from the second wireless communication device using one of the second resources, a reservation response (RRS) including the first traffic priority indicated by the RRQ.

4. The method of claim 2, wherein the communicating the RRQ for the TXOP includes receiving, by the first wireless communication device, the RRQ via one of the first resources associated with the first network operating entity, wherein the communicating the data of the first traffic priority includes receiving, by the first wireless communication device, the data, and wherein the method further comprises:
transmitting, by the first wireless communication device in response to the RRQ using one of the second resources, a reservation response (RRS) including the first traffic priority indicated by the RRQ.

5. The method of claim 2, further comprising:
detecting, by the first wireless communication device in another one of the second resources, a reservation response (RRS) associated with another RRQ for the TXOP, wherein the RRS indicates a second traffic priority; and
determining, by the first wireless communication device, whether the first traffic priority is higher than the second traffic priority,
wherein the communicating the data of the first traffic priority includes transmitting, by the first wireless communication device, the data based on the determining that the first traffic priority is higher than the second traffic priority.

6. The method of claim 5, wherein the first network operating entity has a first access priority of the plurality of access priorities in the TXOP, wherein the another one of the second resources is associated with a second access priority of the plurality of access priorities, and wherein the method further comprises:

determining, by the first wireless communication device, that the first access priority is lower than the second access priority; and determining, by the first wireless communication device, to proceed with the communicating the data of the first traffic priority based on the determining that the first traffic priority is higher than the second traffic priority.

7. The method of claim 5, wherein the first traffic priority is associated with ultra-reliability low latency communication (URLLC) traffic, and wherein the second traffic priority is associated with regular traffic.

8. The method of claim 1, further comprising:

communicating, by the first wireless communication device with a third wireless communication device associated with the first network operating entity, a first RRQ for another TXOP, wherein the first RRQ indicates a second traffic priority;

detecting, by the first wireless communication device, a reservation response (RRS) associated with a second RRQ for the another TXOP, wherein the RRS indicates a third traffic priority;

determining, by the first wireless communication device, whether the third traffic priority is higher than the second traffic priority; and refraining, by the first wireless communication device, from communicating with the third wireless communication device in the another TXOP based on the determining the third traffic priority is higher than the second traffic priority.

9. A method of wireless communication, comprising:

communicating, by a first wireless communication device with a second wireless communication device, a reservation request (RRQ) for communication in a link direction during a transmission opportunity (TXOP) in a shared spectrum, wherein the shared spectrum is shared by a plurality of network operating entities, and wherein the first wireless communication device and the second wireless communication device are associated with a first network operating entity of the plurality of network operating entities;

communicating, by the first wireless communication device with the second wireless communication device, a reservation response (RRS) in a first contention period of a plurality of contention periods associated with a first access priority of the first network operating entity in the link direction; and communicating, by the first wireless communication device with the second wireless communication device, data in the link direction during the TXOP, wherein the TXOP includes a pre-scheduling period and the plurality of contention periods, wherein the pre-scheduling period includes resources, each of the resources associated with one of the plurality of network operating entities, and wherein the RRQ is communicated using one of the resources associated with the first network operating entity.

10. The method of claim 9, further comprising:

monitoring, by the first wireless communication device in a second contention period of the plurality of contention periods, for another RRS for the TXOP, wherein the second contention period is associated with a higher access priority than the first access priority; and determining, by the first wireless communication device, that there is no transmission of RRS in the second contention period based on the monitoring.

11. The method of claim 10, wherein the communicating the RRS includes transmitting, by the first wireless communication device, the RRS based on the determining, and wherein the communicating the data in the link direction during the TXOP includes receiving, by the first wireless communication device, the data in the link direction during the TXOP.

12. The method of claim 10, further comprising transmitting, by the first wireless communication device, a reservation confirmation based on the determining, wherein the TXOP further includes a confirmation period before the first contention period, wherein the reservation confirmation is transmitted during the confirmation period, wherein the communicating the data in the link direction during the TXOP includes transmitting, by the first wireless communication device, the data in the link direction during the TXOP, and wherein the RRS communicated in the first contention period is based on the reservation confirmation.

13. The method of claim 9, wherein the first contention period is further associated with a first traffic priority, wherein the method further comprises:

detecting, by the first wireless communication device, another RRS for the TXOP in a second contention period of the plurality of contention periods, wherein the second contention period is associated with a higher access priority than the first access priority, and wherein the another RRS indicates a second traffic priority; and determining, by the first wireless communication device, whether the first traffic priority is higher than the second traffic priority, and wherein the data is communicated in the link direction during the TXOP based on the determining the first traffic priority is higher than the second traffic priority.

14. The method of claim 9, further comprising:

communicating, by the first wireless communication device with a third wireless communication device associated with the first network operating entity, a first RRQ for another TXOP, wherein the first RRQ indicates a second traffic priority;

detecting, by the first wireless communication device, a RRS associated with a second RRQ for the another TXOP, wherein the second RRQ indicates a third traffic priority;

determining, by the first wireless communication device, whether the third traffic priority is higher than the second traffic priority; and refraining, by the first wireless communication device, from communicating with the third wireless communication device in the another TXOP based on the determining the third traffic priority is higher than the second traffic priority.

15. The method of claim 9, further comprising:

monitoring, by the first wireless communication device in a second contention period of the plurality of contention periods, for another RRS for the TXOP, wherein the second contention period is associated with a second access priority higher than the first access priority, and wherein the second access priority is for the first network operating entity in another link direction; and determining, by the first wireless communication device, that there is no RRS in the second contention period based on the monitoring, wherein the data is communicated in the link direction based on the determining.

16. An apparatus comprising a transceiver configured to:
communicate with a first wireless communication device, a reservation request (RRQ) for a transmission opportunity (TXOP) in a shared spectrum, wherein the shared spectrum is shared by a plurality of network operating entities, wherein the apparatus and the first wireless communication device are associated with a first network operating entity of the plurality of network operating entities, and wherein the RRQ indicates a first traffic priority of data to be communicated; and
communicate with the first wireless communication device, the data of the first traffic priority during the TXOP,
wherein the TXOP includes a pre-scheduling period and a contention period,
wherein the pre-scheduling period includes first resources, each of the first resources associated with one of the plurality of network operating entities,
wherein the contention period includes second resources, each of the second resources associated with one of a plurality of access priorities, and
wherein the RRQ is communicated using one of the first resources associated with the first network operating entity.

17. The apparatus of claim 16, wherein the plurality of access priorities includes an uplink (UL) access priority and a downlink (DL) access priority for at least one of the plurality of network operating entities.

18. The apparatus of claim 17, wherein the transceiver is further configured to:
communicate the RRQ for the TXOP by transmitting the RRQ using one of the first resources associated with the first network operating entity;
receive, from the first wireless communication device, a reservation response (RRS) via one of the second resources, wherein the RRS includes the first traffic priority indicated by the RRQ; and
communicate the data of the first traffic priority by transmitting, to the first wireless communication device, the data.

19. The apparatus of claim 17, wherein the transceiver is further configured to:
communicate the RRQ for the TXOP by receiving the RRQ via one of the first resources associated with the first network operating entity;
transmit, in response to the RRQ, a reservation response (RRS) using one of the second resources, wherein the RRS includes the first traffic priority indicated by the RRQ; and
communicate the data of the first traffic priority by receiving the data.

20. The apparatus of claim 17, further comprising a processor configured to:
detect, in another one of the second resources, a reservation response (RRS) associated with another RRQ for the TXOP, wherein the RRS indicates a second traffic priority; and
determine whether the first traffic priority is higher than the second traffic priority,
wherein the transceiver is further configured to communicate the data of the first traffic priority by transmitting the data when the first traffic priority is determined to be higher than the second traffic priority.

21. The apparatus of claim 20, wherein the first network operating entity has a first access priority of the plurality of access priorities in the TXOP, wherein the another one of the second resources is associated with a second access priority of the plurality of access priorities, and wherein the processor is further configured to:
determine that the first access priority is lower than the second access priority; and
determine to proceed with communicating the data of the first traffic priority when first traffic priority is determined to be higher than the second traffic priority.

22. The apparatus of claim 16, wherein the transceiver is further configured to communicate with a second wireless communication device associated with the first network operating entity, a first RRQ for another TXOP, wherein the first RRQ indicates a second traffic priority, and wherein the apparatus further comprises a processor configured to:
detect a reservation response (RRS) associated with a second RRQ for the another TXOP, and wherein the RRS indicates a third traffic priority;
determine whether the third traffic priority is higher than the second traffic priority; and
refrain from communicating with the second wireless communication device in the another TXOP when the third traffic priority is determined to be higher than the second traffic priority.

23. An apparatus comprising a transceiver configured to:
communicate, with a first wireless communication device, a reservation request (RRQ) for communication in a link direction during a transmission opportunity (TXOP) in a shared spectrum, wherein the shared spectrum is shared by a plurality of network operating entities, and wherein the apparatus and the first wireless communication device are associated with a first network operating entity of the plurality of network operating entities;
communicate, with the first wireless communication device, a reservation response (RRS) in a first contention period of a plurality of contention periods associated with a first access priority of the first network operating entity in the link direction; and
communicate, with the first wireless communication device, data in the link direction during the TXOP,
wherein the TXOP includes a pre-scheduling period and the plurality of contention periods, and a transmission period,
wherein the pre-scheduling period includes resources, each of the resources associated with one of the plurality of network operating entities, and
wherein the RRQ is communicated using one of the resources associated with the first network operating entity.

24. The apparatus of claim 23, further comprising a processor configured to:
monitor, in a second contention period of the plurality of contention periods, for another RRS for the TXOP, wherein the second contention period is associated with a higher access priority than the first access priority; and
determine that there is no transmission of RRS in the second contention period based on the monitoring.

25. The apparatus of claim 24, wherein the transceiver is further configured to:
communicate the RRS by transmitting the RRS when there is no transmission of RRS in the second contention period, and
communicate the data in the link direction during the TXOP by receiving the data in the link direction during the TXOP.

26. The apparatus of claim 24, wherein the transceiver is further configured to:
- transmit a reservation confirmation when there is no transmission of RRS in the second contention period, wherein the TXOP further includes a confirmation period before the first contention period, and wherein the reservation confirmation is transmitted during the confirmation period, wherein the RRS communicated in the first contention period is based on the reservation confirmation; and
- communicate the data in the link direction during the TXOP by transmitting the data in the link direction during the TXOP.

27. The apparatus of claim 23, wherein the first contention period is further associated with a first traffic priority, wherein the apparatus further comprises a processor configured to:
- detect another RRS for the TXOP in a second contention period of the plurality of contention periods, wherein the second contention period is associated with a higher access priority than the first access priority, and wherein the another RRS indicates a second traffic priority; and
- determine whether the first traffic priority is higher than the second traffic priority, and
- wherein the data is communicated in the link direction during the TXOP when the first traffic priority is determined to be higher than the second traffic priority.

28. The apparatus of claim 23, wherein the transceiver is further configured to communicate, with a second wireless communication device associated with the first network operating entity, a first RRQ for another TXOP, wherein the first RRQ indicates a second traffic priority, and wherein the apparatus further comprises a processor configured to:
- detect a RRS associated with a second RRQ for the another TXOP, wherein the second RRQ indicates a third traffic priority;
- determine whether the third traffic priority is higher than the second traffic priority; and
- refrain from communicating with the second wireless communication device in the another TXOP when the third traffic priority is determined to be higher than the second traffic priority.

* * * * *